(12) United States Patent
Hayashi et al.

(10) Patent No.: US 7,663,831 B2
(45) Date of Patent: Feb. 16, 2010

(54) REPRODUCTION DEVICE AND METHOD, RECORDING MEDIUM, AND PROGRAM

(75) Inventors: Kenichi Hayashi, Tokyo (JP); Masaki Endo, Tokyo (JP); Tomohiro Ohama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/579,541

(22) PCT Filed: Nov. 10, 2004

(86) PCT No.: PCT/JP2004/016649

§ 371 (c)(1),
(2), (4) Date: Dec. 12, 2006

(87) PCT Pub. No.: WO2005/050643

PCT Pub. Date: Jun. 2, 2005

(65) Prior Publication Data

US 2007/0103805 A1    May 10, 2007

(30) Foreign Application Priority Data

Nov. 18, 2003 (JP) ............................. 2003-388318

(51) Int. Cl.
*G11B 5/09* (2006.01)
(52) U.S. Cl. .............................. 360/51; 360/31; 360/48; 360/39; 360/53; 369/59.25; 369/47.32
(58) Field of Classification Search ................... 360/31, 360/51, 53
See application file for complete search history.

(56) References Cited

U.S. PATENT DOCUMENTS 4,620,300 A * 10/1986 Ogawa ................... 369/30.27
5,612,938 A * 3/1997 Dohmeier et al. ......... 369/47.32
5,841,750 A * 11/1998 Suzuki et al. ............ 369/47.35
5,844,920 A * 12/1998 Zook et al. .................. 714/769
5,881,037 A * 3/1999 Tanaka et al. ............ 369/59.24
5,930,216 A * 7/1999 Suzuki et al. ............ 369/59.19
6,009,549 A * 12/1999 Bliss et al. .................. 714/769
6,324,027 B1* 11/2001 Chainer et al. ................ 360/51

(Continued)

FOREIGN PATENT DOCUMENTS

JP          5-258475          10/1993

(Continued)

*Primary Examiner*—Dismery E Mercedes
(74) *Attorney, Agent, or Firm*—Oblon, Spivak, McClelland, Maier & Neustadt, L.L.P.

(57) ABSTRACT

The present invention relates to a reproducing apparatus which, in a case where a burst error has occurred, corrects an error preceding a synchronization pattern detected thereafter to have less errors. A bit slip judging section 81 in a bit slip correcting section 53 calculates a bit slip correction amount and a bit slip correction position on the basis of phase error signals detected by a phase error detecting section 51, synchronization pattern signals detected by a synchronization detecting section 52, reproduced clocks and detected data. A FIFO control section 82 controls a FIFO buffer 83 on the basis of the bit slip correction amount and the bit slip correction position, to perform bit slip correction. As a result, in the case where a burst error has occurred, an error preceding a synchronization pattern detected thereafter is corrected, whereby an error reduction can be implemented. The present invention is applicable to a reproducing apparatus.

7 Claims, 27 Drawing Sheets

U.S. PATENT DOCUMENTS

| | | | |
|---|---|---|---|
| 6,449,111 B1 * | 9/2002 | Kool et al. | 360/48 |
| 7,054,088 B2 * | 5/2006 | Yamazaki et al. | 360/65 |
| 2001/0055247 A1 * | 12/2001 | Tateishi et al. | 369/44.32 |
| 2003/0194036 A1 | 10/2003 | Han et al. | |
| 2004/0179444 A1 * | 9/2004 | Hikimura et al. | 369/47.3 |

FOREIGN PATENT DOCUMENTS

| | | |
|---|---|---|
| JP | 7-320419 | 12/1995 |
| JP | 10-255409 | 9/1998 |
| JP | 2003-109318 | 4/2003 |
| JP | 2003-272307 | 9/2003 |

* cited by examiner

FIG. 6
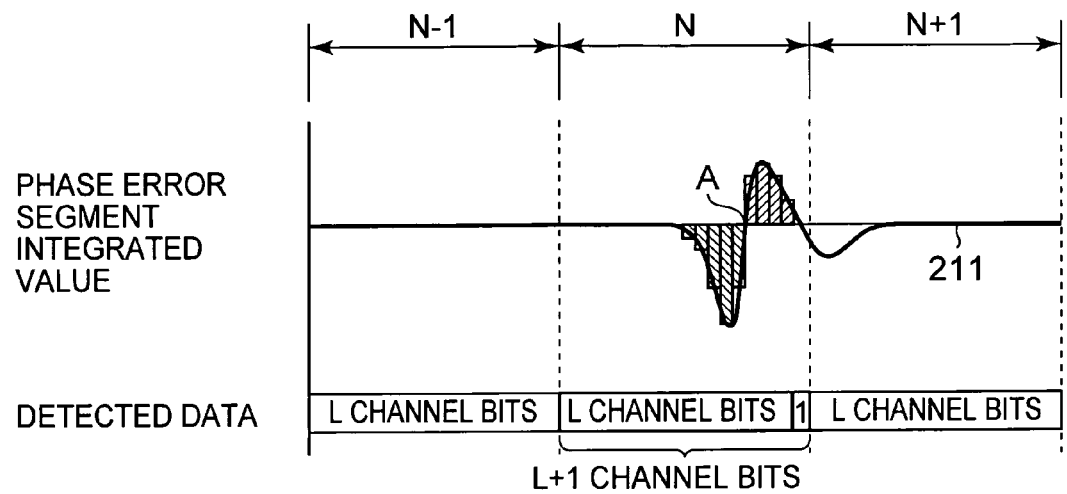
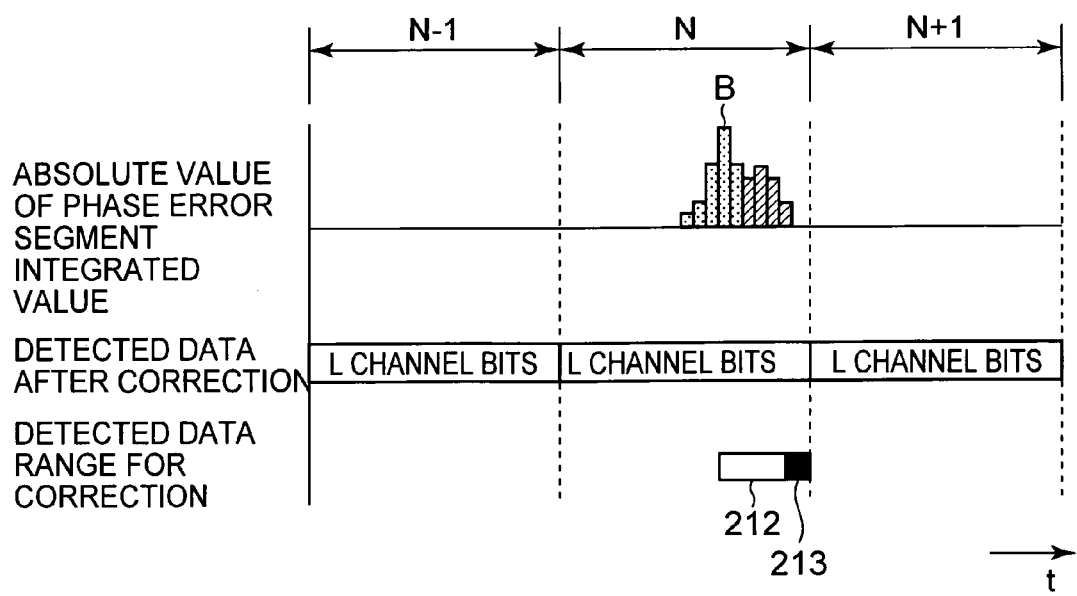

FIG. 8
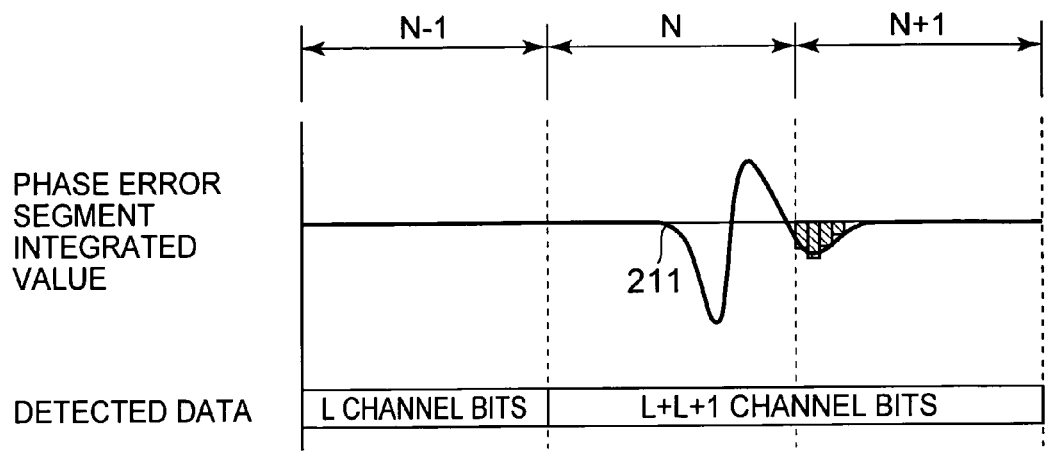
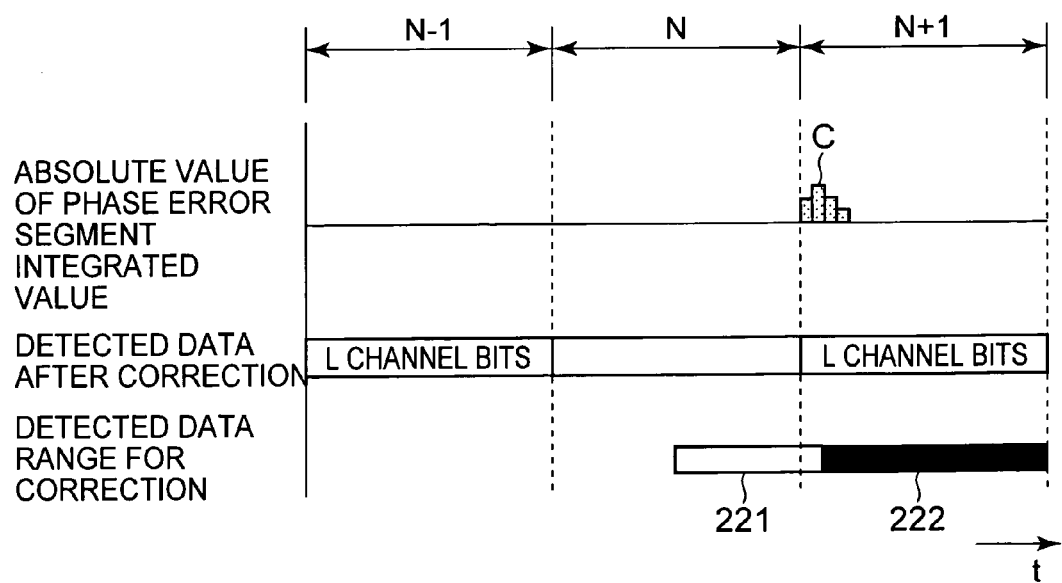

FIG. 22
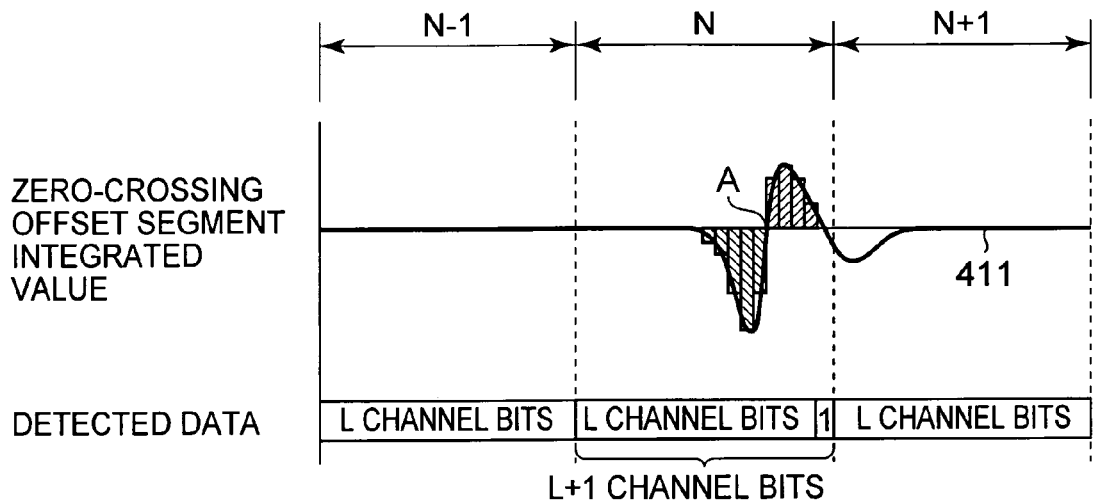
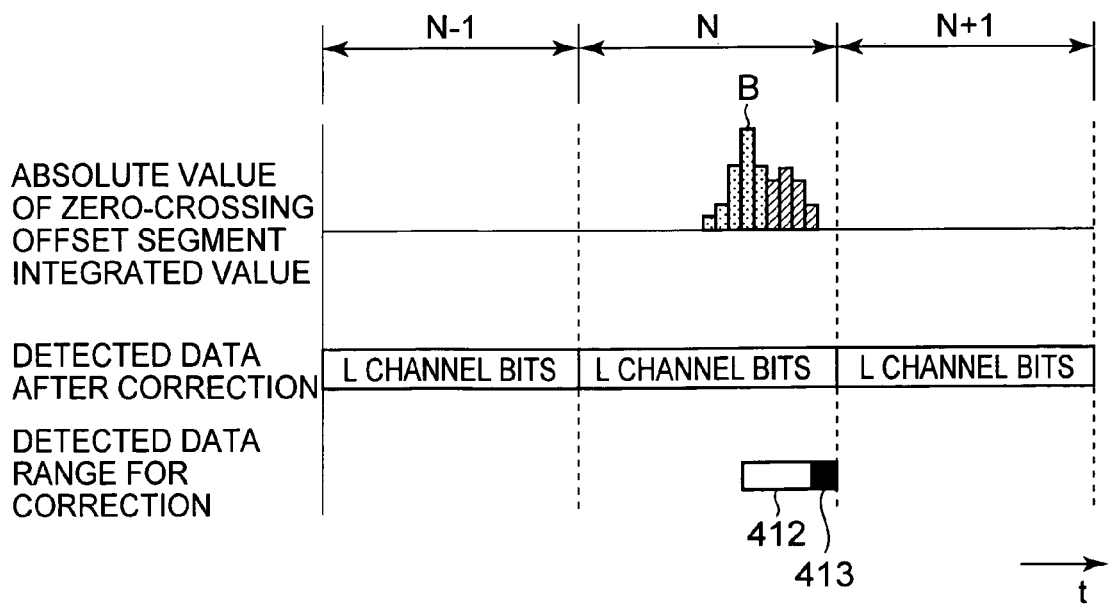

FIG. 24
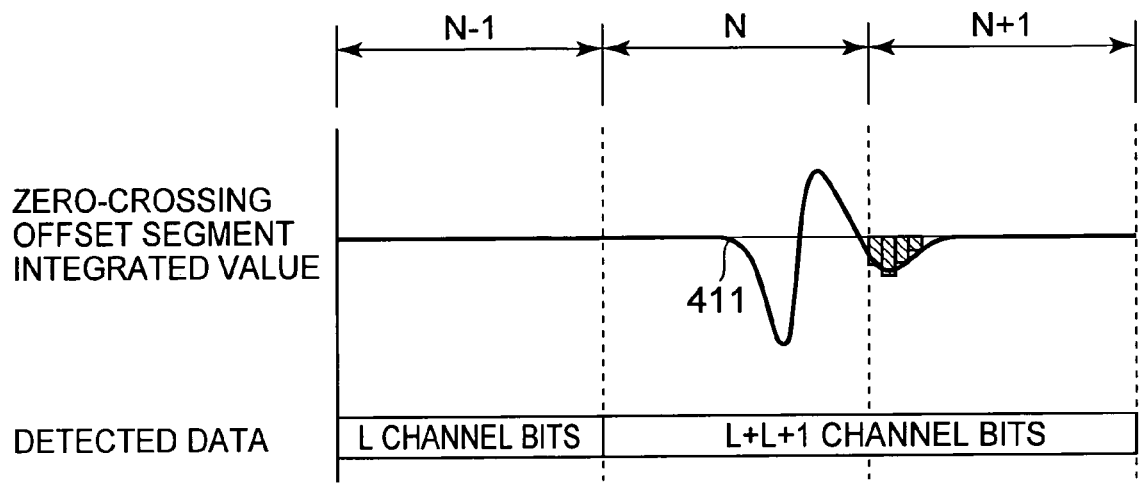
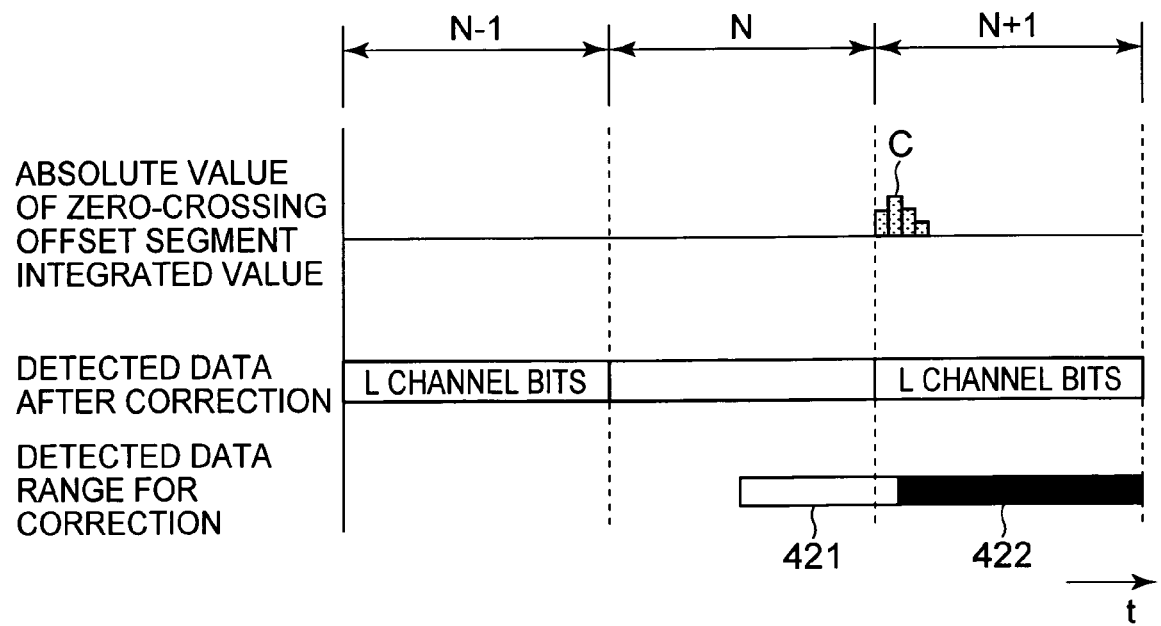

REPRODUCTION DEVICE AND METHOD, RECORDING MEDIUM, AND PROGRAM

TECHNICAL FIELD

The present invention relates to a reproducing apparatus and method, a recording medium, and a program, and more particularly to a reproducing apparatus and method, a recording medium, and a program, all capable of reducing more errors caused by so-called bit slips.

BACKGROUND ART

A reproducing apparatus, such as an optical disc apparatus, a HDD (Hard Disk Drive), a digital video cassette or a data streamer, generates a clock from a reproduced signal acquired by reading a recording medium, and processes the reproduced signal using the generated clock, to reproduce data recorded on the recording medium.

FIG. 1 is a diagram showing a conventional configuration of a reproducing apparatus for recording media.

An equalizer 11 shapes a reproduced signal from a recording medium, and the reproduced signal is supplied to an A/D converter (Analog/Digital converter) 12.

The A/D converter 12 converts the reproduced signal, which is an analog signal supplied from the equalizer 11 into digital signals on the basis of reproduced clocks to be supplied from a clock generation section 13, and supplies the digital signals generated after the conversion, to the clock generation section 13 and an equalizer 14.

The clock generation section 13 includes a phase error detecting section 21 and a VCO (Voltage Controlled Oscillator) 22, and generates reproduced clocks using a PLL (Phase Locked Loop) system. The reproduced clocks are supplied to the A/D converter 12, the clock generation section 13, the equalizer 14 and a data detecting section 15.

A phase error integrating section 21 detects a phase error between a reproduced clock and the corresponding digital signal outputted from the A/D converter 12, and supplies a signal corresponding to the phase error, to the VCO 22.

The VCO 22 outputs a reproduced clock having such a frequency as to reduce the phase error, on the basis of the signal from the phase error detecting section 21. The reproduced clock is supplied further to the phase error detecting section 21.

The equalizer 14 shapes the digital signal on the basis of the reproduced clock, and supplies the shaped digital signal to the data detecting section 15.

The data detecting section 15 corrects the digital signal error by Viterbi decoding, and outputs the error-corrected digital signal as detected data.

When the recording medium has a defect, there occurs a deviation, i.e., a so-called bit slip, between a clock generated and data reproduced, from an input signal. When the bit slip has occurred, the error propagates to the subsequent data, leaving the error uncorrectable.

In order to avoid such a situation, specific patterns called synchronization patterns are arranged at predetermined intervals in the recording medium, whereby to prevent propagation of the error caused by the bit slip using the synchronization patterns.

There has been proposed a synchronization circuit (e.g., see Patent Document 1), in which: a synchronization pattern is detected from a digital signal; clock pulses are counted; a predicted synchronization pattern position is set on the basis of a count value; a predicted synchronization pattern range is set on the basis of the count value; a count value is held; a sync signal is outputted by referring to the detected synchronization pattern, the count value, the predicted synchronization pattern position, the set synchronization pattern range and the count value held, and the counter is reset by this sync signal. In this synchronization circuit, in a case where a synchronization pattern has been detected within the set predicted range, a sync signal is outputted at a timing at which the synchronization pattern has been detected, whereas in a case where no synchronization pattern has been detected within the set predicted range, a sync signal is outputted at the set timing. Moreover, in a case where a synchronization pattern has been detected beyond the set predicted range, a count value in the counter is compared with a count value held, and if both counts coincide, a sync signal is outputted at that timing, whereas if both count values do not coincide, the count in the counter is held.

Furthermore, there has been a synchronization circuit in which a phase deviation in a reproduced clock generated from a reproduced signal is detected, and any loss or gain in the reproduced signal is outputted as a bit slip detection signal, on the basis of this phase deviation, whereby to prevent propagation of an error caused by a bit slip (see Patent Document 2).

[Patent Document 1]
Japanese Patent Application Publication No. 8-212705
[Patent Document 2]
Japanese Patent Application Publication No. 10-255409

However, amidst growing incidences of signal defects due to dust and blemishes as the recording densities in recording media increase, prevention of propagation of burst errors merely with synchronization patterns is not enough to guarantee stable reading of data recorded on recording media.

Moreover, there may actually be cases where no synchronization pattern is detected throughout phase locking in the PLL after a bit slip has occurred due to a signal defect, and thus, despite the fact that the reproduced signal itself has recovered, the burst error propagates further to a next synchronization pattern, thus elevating the error rate.

MEANS FOR SOLVING THE PROBLEMS

A reproducing apparatus of the present invention is characterized by including: synchronization pattern detecting means for detecting a synchronization pattern which is detected from a reproduced signal from a data storage medium and which is contained in data; error detecting means for detecting an error between the reproduced signal and a reference point specified by a time at which a half cycle has elapsed from a start time of one cycle of a clock signal reproduced from the reproduced signal, and by an amplitude of the reproduced signal; and correcting means for correcting a deviation of the data from the clock signal, on the basis of a difference between an interval of the synchronization pattern detected and a predetermined period, and of a time for a segment in which it is assumed, from the error detected, that the deviation of the data from the clock signal has occurred, out of segments into which the interval of the synchronization pattern is divided.

The synchronization pattern detecting means may include: detection range setting means for setting a detection range from which the synchronization pattern is detected, on the basis of a count value of the clock signal; and synchronization pattern detection signal inserting means for inserting a signal representing detection of the synchronization pattern, at a time specified by the predetermined period, where the synchronization pattern has not been detected within the detection range.

The error detecting means may detect a phase error, which is an error in a time direction between the reference point and the reproduced signal, and the correcting means may correct the deviation of the data from the clock signal, on the basis of the difference between the interval of the synchronization pattern detected and the predetermined period, and of the time for the segment in which it is assumed, from the phase error detected, that the deviation of the data from the clock signal has occurred, out of the segments into which the interval of the synchronization pattern is divided.

The error detecting means may detect a zero-crossing offset, which is an error in an amplitude direction between the reference point and the reproduced signal, and the correcting means may correct the deviation of the data from the clock signal, on the basis of the difference between the interval of the synchronization pattern detected and the predetermined period, and of the time for the segment in which it is assumed, from the zero-crossing offset detected, that the deviation of the data from the clock signal has occurred, out of the segments into which the interval of the synchronization pattern is divided.

The correcting means may include: deviation amount detecting means for detecting the difference between the interval of the synchronization pattern and the predetermined period, on the basis of the clock signal, as a deviation amount; error integrating means for integrating the error for each of the segments; deviation occurrence time detecting means for detecting a deviation occurrence time, which is a time for the segment in which an absolute value of the integrated value integrated becomes maximum between two successive ones of the synchronization patterns; a FIFO (First In First Out) buffer for storing the data equivalent to a period longer than the predetermined period; and control means for controlling the FIFO buffer such that the data equivalent to a period from the deviation occurrence time to detection of the synchronization pattern is moved in a time direction so as to correspond to the deviation amount, on the basis of the deviation amount and the deviation occurrence time, in a case where the deviation amount other than 0 has been detected.

A reproducing method of the present invention is characterized by including: a synchronization pattern detecting step of detecting a synchronization pattern which is detected from a reproduced signal from a data storage medium and which is contained in data; an error detecting step of detecting an error between the reproduced signal and a reference point specified by a time at which a half cycle has elapsed from a start time of one cycle of a clock signal reproduced from the reproduced signal, and by an amplitude of the reproduced signal; and a correcting step of correcting a deviation of the data from the clock signal, on the basis of a difference between an interval of the synchronization pattern detected and a predetermined period, and of a time for a segment in which it is assumed, from the error detected, that the deviation of the data from the clock signal has occurred, out of segments into which the interval of the synchronization pattern is divided.

A program for a recording medium of the present invention is characterized by including: a synchronization pattern detecting step of detecting a synchronization pattern which is detected from a reproduced signal from a data storage medium and which is contained in data; an error detecting step of detecting an error between the reproduced signal and a reference point specified by a time at which a half cycle has elapsed from a start time of one cycle of a clock signal reproduced from the reproduced signal, and by an amplitude of the reproduced signal; and a correcting step of correcting a deviation of the data from the clock signal, on the basis of a difference between an interval of the synchronization pattern detected and a predetermined period, and of a time for a segment in which it is assumed, from the error detected, that the deviation of the data from the clock signal has occurred, out of segments into which the interval of the synchronization pattern is divided.

A program of the present invention is characterized by including: a synchronization pattern detecting step of detecting a synchronization pattern which is detected from a reproduced signal from a data storage medium and which is contained in data; an error detecting step of detecting an error between the reproduced signal and a reference point specified by a time at which a half cycle has elapsed from a start time of one cycle of a clock signal reproduced from the reproduced signal, and by an amplitude of the reproduced signal; and a correcting step of correcting a deviation of the data from the clock signal, on the basis of a difference between an interval of the synchronization pattern detected and a predetermined period, and of a time for a segment in which it is assumed, from the error detected, that the deviation of the data from the clock signal has occurred, out of segments into which the interval of the synchronization pattern is divided.

In the reproducing apparatus and method, the recording medium and the program of the present invention, a synchronization pattern which is detected from a reproduced signal from a data storage medium and which is contained in data is detected, and an error between the reproduced signal and a reference point specified by a time at which a half cycle has elapsed from a start time of one cycle of a clock signal reproduced from the reproduced signal, and by an amplitude of the reproduced signal is detected. And a deviation of the data from the clock signal is corrected on the basis of a difference between an interval of the synchronization pattern detected and a predetermined period, and of a time for a segment in which it is assumed, from the error detected, that the deviation of the data from the clock signal has occurred, out of segments into which the interval of the synchronization pattern is divided.

BRIEF DESCRIPTION OF THE DRAWINGS

FIG. 6 It is a diagram showing a method of calculating a bit slip occurrence position, in the case where a bit slip has occurred.

FIG. 8 It is a diagram showing a method of calculating a bit slip occurrence position, in a case where the synchronization pattern has been interpolated.

FIG. 22 It is a diagram showing a method of calculating a bit slip occurrence position, in the case where a bit slip has occurred.

FIG. 24 It is a diagram showing a method of calculating a bit slip occurrence position, in a case where the synchronization pattern has been interpolated.

DESCRIPTION OF REFERENCE NUMERALS

31: equalizer, 32: A/D converting section, 33: clock generating section, 34: equalizer, 35: data detecting section, 36: error correcting section, 41: phase error detecting section, 42: VCO, 51: phase error detecting section, 52: synchronization detecting section, 53: bit slip correcting section, 61: drive, 71: magnetic disk, 72: optical disc, 73: magneto-optical disc, 74: semiconductor memory, 81: bit slip judging section, 82: FIFO control section, 83: FIFO, 84: detection range setting section, 85: synchronization pattern detection signal inserting section, 91: synchronization pattern interval counter, 92: phase error integrating section, 93: maximum phase error time storing section, 301: zero-crossing offset detecting section, 302: bit slip correcting section, 311: bit slip judging section, 321: zero-crossing offset integrating section, 322: maximum zero-crossing offset time storing section

BEST MODES FOR CARRYING OUT THE INVENTION

In the following description of the best modes of the present invention, inventions to be disclosed correspond to embodiments as follows, by way of example. The presence of an embodiment described in the present Specification but not described herein as corresponding to an invention should not mean that the embodiment does not correspond to the invention. Conversely, a description of an embodiment herein as corresponding to an invention should not mean that the embodiment does not correspond to an invention or inventions other than that invention.

Furthermore, this description does not comprehend all the inventions described in the Specification. In other words, this description does not deny the presence of an invention or inventions described in the Specification but not claimed in the present application, i.e., the presence of an invention or inventions to be appearing or added due to divisional application(s) or correction(s).

Embodiments of the present invention will be described below with reference to the drawings.

Figure 1:
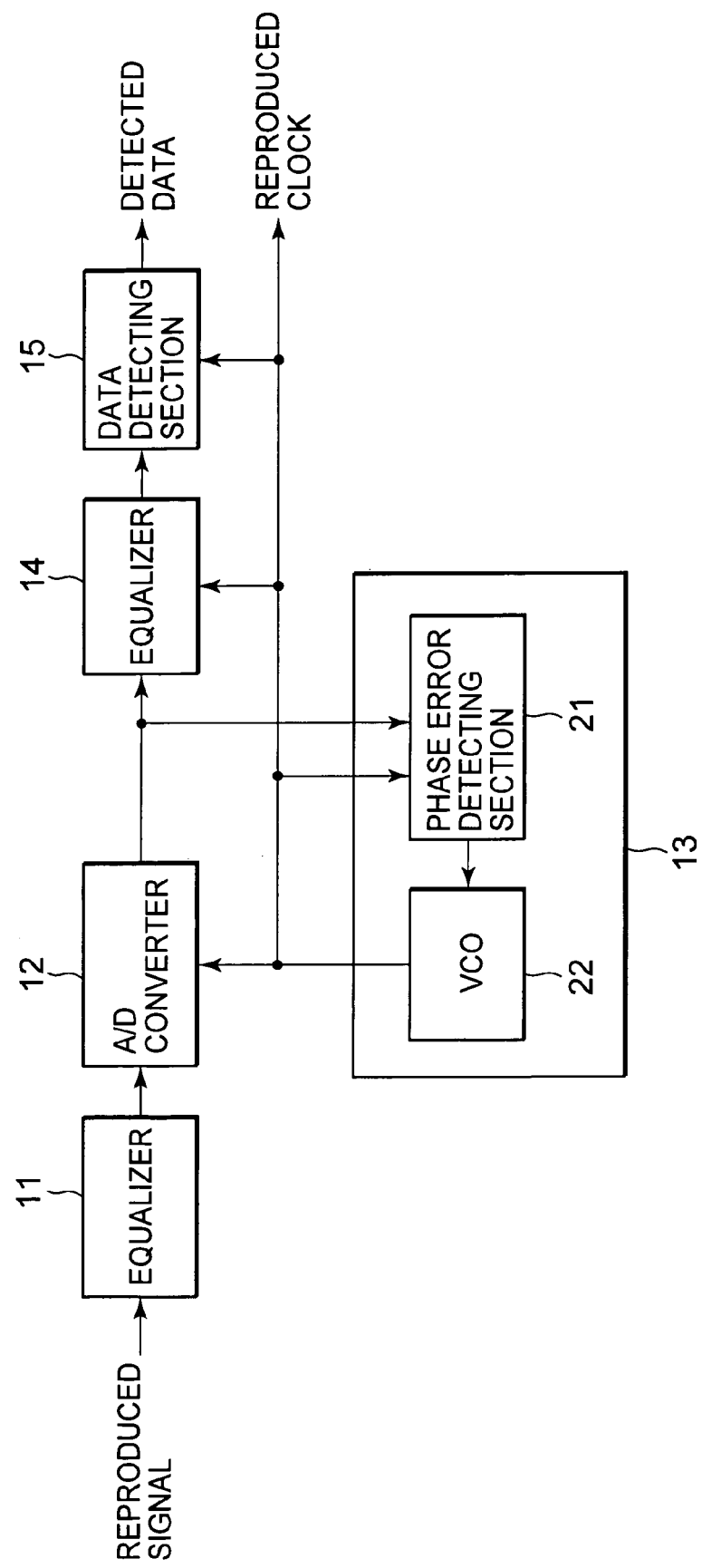
FIG. 1 It is a block diagram showing a conventional reproducing apparatus.
Figure 2:
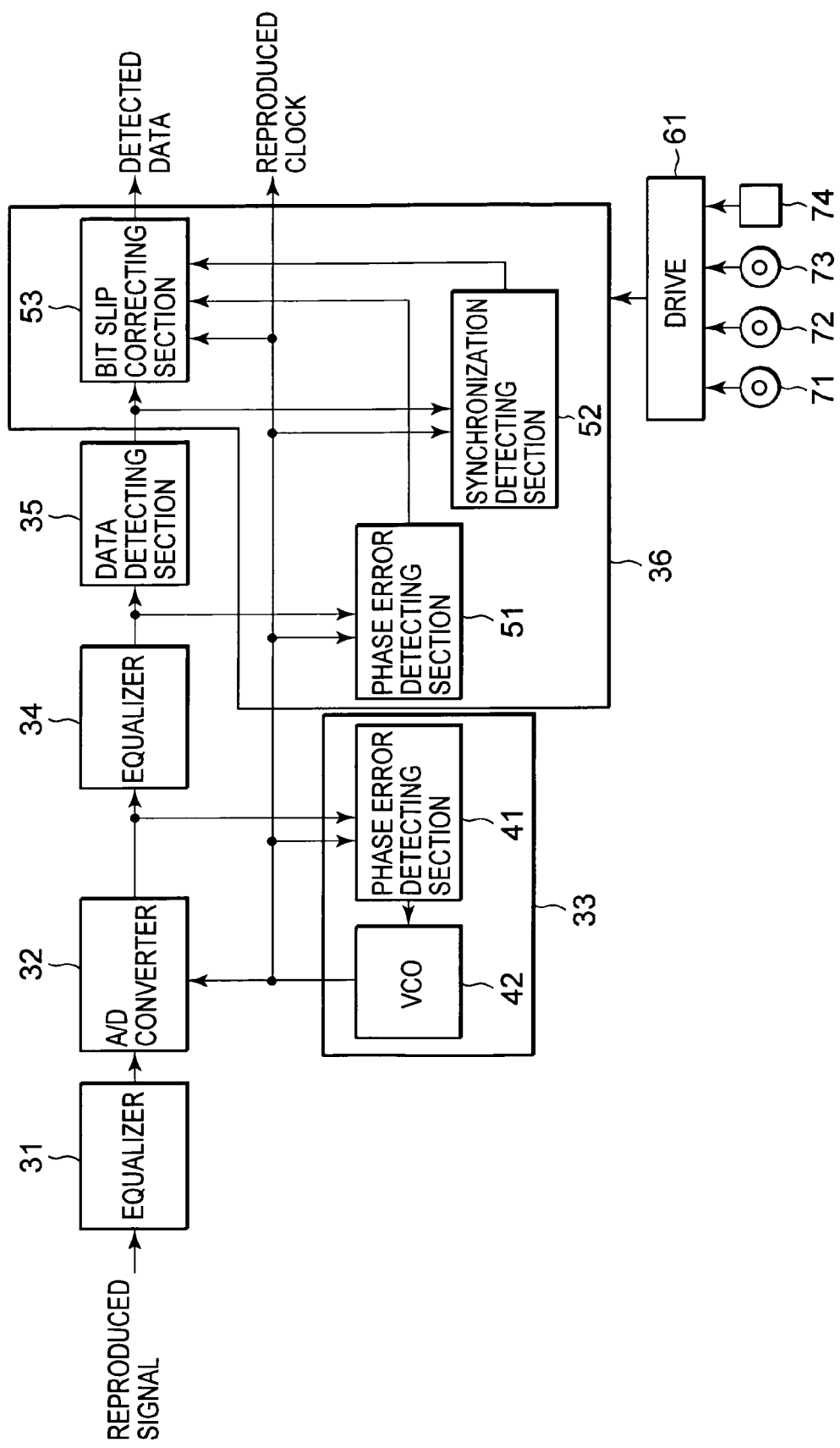
FIG. 2 It is a block diagram showing a configuration of an embodiment of a reproducing apparatus of the present invention.

FIG. 2 is a block diagram showing a configuration of an embodiment of a reproducing apparatus of the present invention.

An equalizer 31 shapes a reproduced signal which a pickup, not shown, has reproduced from a recording medium such as an optical disc, a hard disk or a digital video cassette, and supplies the reproduced signal thus reproduced to an A/D converting section 32. This recording medium is an example of a data storage medium, and may thus include any medium that records data by chemical or physical change and is mechanically driven for reproduction.

The A/D converting section 32 converts the reproduced signal, which is an analog signal supplied from the equalizer 31, into digital signals on the basis of reproduced clocks to be supplied from a clock generating section 33. The A/D converting section 32 supplies the digital signals generated through the conversion, to the clock generating section 33 and an equalizer 34.

The clock generating section 33 includes a phase error detecting section 41 and a VCO 42, and generates the reproduced clocks from the digital signals using the PLL system.

The phase error detecting section 41 detects a phase error between a reproduced clock and the corresponding digital signal outputted from the A/D converting section 32, and supplies a signal representing the magnitude of the phase error, to the VCO 42.

The VCO 42 changes an oscillating frequency so as to correspond to the magnitude of the phase error on the basis of the corresponding signal from the phase error detecting section 41, to output a reproduced clock of such a frequency reducing the phase error more. The reproduced clock is supplied to the A/D converting section 32, the phase error detecting section 41, a phase error detecting section 51, a synchronization detecting section 52 and a bit slip correcting section 53.

The equalizer 34 adjusts the edge position of the digital signal in the time direction on the basis of the corresponding reproduced clock, to shape the digital signal, and supplies the shaped digital signal to a data detecting section 35 and an error correcting section 36.

The shaped digital signal will hereinafter be referred to also as "equalized amplitude information".

The data detecting section 35 corrects the digital signal error by means of Viterbi decoding, and outputs the error-corrected digital signal as detected data. Note that the data detecting section 35 may alternatively utilize a maximum-likelihood decoding system other than Viterbi decoding.

The error correcting section 36 includes the phase error detecting section 51, the synchronization detecting section 52 and the bit slip correcting section 53.

The phase error detecting section 51 detects a phase error between equalized amplitude information supplied from the equalizer 34 and the corresponding reproduced clock, and supplies a phase error signal representing the phase error, to the bit slip correcting section 53.

The synchronization detecting section 52 detects a synchronization pattern composed of a predetermined bit pattern on the basis of detected data and the corresponding reproduced clocks, and supplies a synchronization pattern detection signal indicating that a synchronization pattern has been detected, to the bit slip correcting section 53.

The bit slip correcting section 53 corrects an error caused by a bit slip, on the basis of the detected data, the phase error signal, the synchronization pattern detection signal, and the reproduced clock, and outputs the corrected detected data.

A drive 61 is connected to the reproducing apparatus, as necessary. A magnetic disk 71, an optical disc 72, a magneto-optical disc 73 or a semiconductor memory 74 attached is attached to the drive 61, whenever appropriate. The drive 61 reads a program stored in the magnetic disk 71, optical disc 72, magneto-optical disc 73 or semiconductor memory 74 attached, and supplies the read program to the error correcting section 36.

Thus, the error correcting section 36 can execute the program read from the magnetic disk 71, optical disc 72, magneto-optical disc 73 or semiconductor memory 74, which is an example of the recording medium.

Note that the detected data outputted from the bit slip correcting section 53 is decoded by a predetermined system such as EFM (Eight to Fourteen Modulation), and error-corrected by, e.g., ECC (Error Correction Coding).

Figure 3:
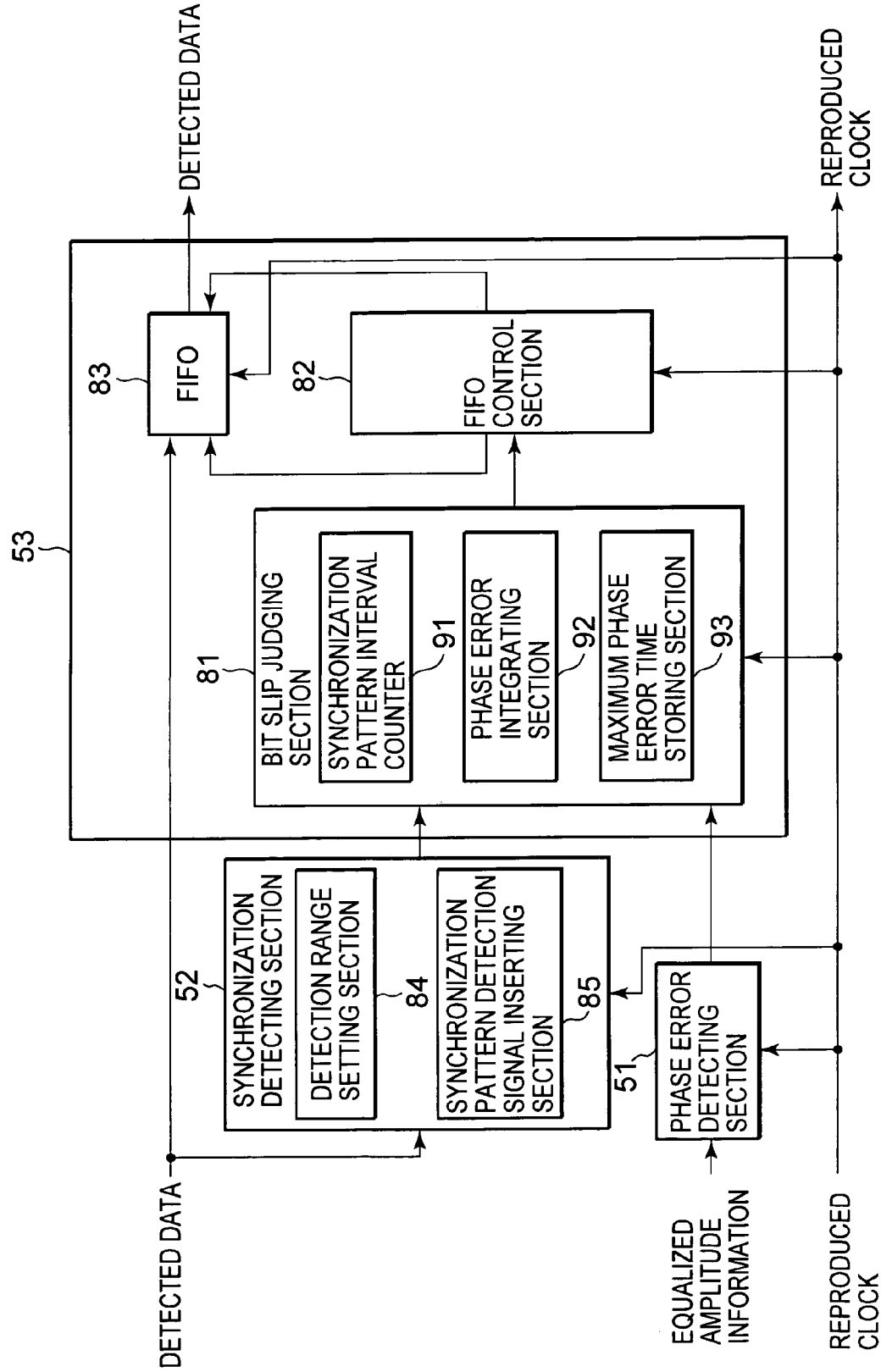
FIG. 3 It is a block diagram showing details of a synchronization detecting section and a bit slip correcting section.

FIG. 3 is a block diagram showing configurational details of the synchronization detecting section 52 and the bit slip correcting section 53.

The bit slip correcting section 53 includes a bit slip judging section 81, a FIFO control section 82 and a FIFO buffer 83. Moreover, the synchronization detecting section 52 includes a detection range setting section 84 and a synchronization pattern detection signal inserting section 85.

Furthermore, the bit slip judging section 81 includes a synchronization pattern interval counter 91, a phase error integrating section 92 and a maximum phase error time storing section 93.

The detection range setting section 84 sets a detection range from which a synchronization pattern is to be detected, on the basis of a reproduced clock signal count value.

The synchronization pattern detection signal inserting section 85 inserts a synchronization pattern detection signal at a predetermined period, in a case where no synchronization pattern is detected within the detection range. Here, "the predetermined period" means each of equal intervals at which specific patterns as synchronization patterns, which are different from recorded data, are usually embedded in a recorded signal, generally in a recording medium (data storage medium) such as an optical disc. Therefore, the period at which the synchronization pattern detection signal is inserted is determined by the format of a recording medium.

The bit slip judging section 81 detects a deviation amount between a reproduced clock and the corresponding detected data on the basis of a synchronization pattern detection signal supplied from the synchronization detecting section 52 and the phase error signal supplied from the phase error detecting section 51, and also specifies a time at which the deviation between the reproduced clock and the detected data is predicted to have occurred. The bit slip judging section 81 supplies a signal representing the deviation amount between the reproduced clock and the detected data and a signal representing the time at which the deviation is predicted to have occurred, to the FIFO control section 82.

The signal representing the deviation amount between the reproduced clock and the detected data and the signal representing the time at which the deviation is predicted to have occurred will hereinafter be referred to also as "bit slip correction information".

The synchronization pattern interval counter 91 detects a difference between the predetermined period and the sync signal detected by the synchronization detecting section 51 on the basis of the reproduced clock, as the deviation amount.

The phase error integrating section 92 integrates phase errors detected within each of segments into which an interval between two successive synchronization patterns is divided, whereby to calculate a phase error segment integrated value. Here, a segment into which the interval is divided is determined by any of the predetermined number of phase errors, a predetermined period and predetermined channel bits.

The maximum phase error time storing section 93 detects a time at which a deviation between a reproduced clock and equalized amplitude information is predicted to have occurred, which is a time defining a segment in which the absolute value of an integrated value obtained by integration becomes maximum between two successive synchronization patterns, and stores that time.

The FIFO control section 82 controls the FIFO buffer 83 on the basis of the signal representing the deviation amount between the reproduced clock and the detected data supplied from the bit slip judging section 81, and the signal representing the time at which the deviation is predicted to have occurred, whereby to cause the FIFO buffer 83 to correct the deviation of the stored detected data from the corresponding reproduced clock.

The FIFO buffer 83 is a First-In First-Out buffer for storing an amount of detected data larger than the number of detected data bits arranged between two synchronization patterns. The FIFO buffer 83 moves the detected data in the time direction so as to correspond to the deviation amount on the basis of control information supplied from the FIFO control section 82, whereby to perform bit slip correction to output the corrected data as detected data.

Note that the phase error integrating section 92 may alternatively average phase errors detected in each of the segments into which the interval between two successive synchronization patterns is divided, whereby to calculate a phase error segment average.

Figure 4:
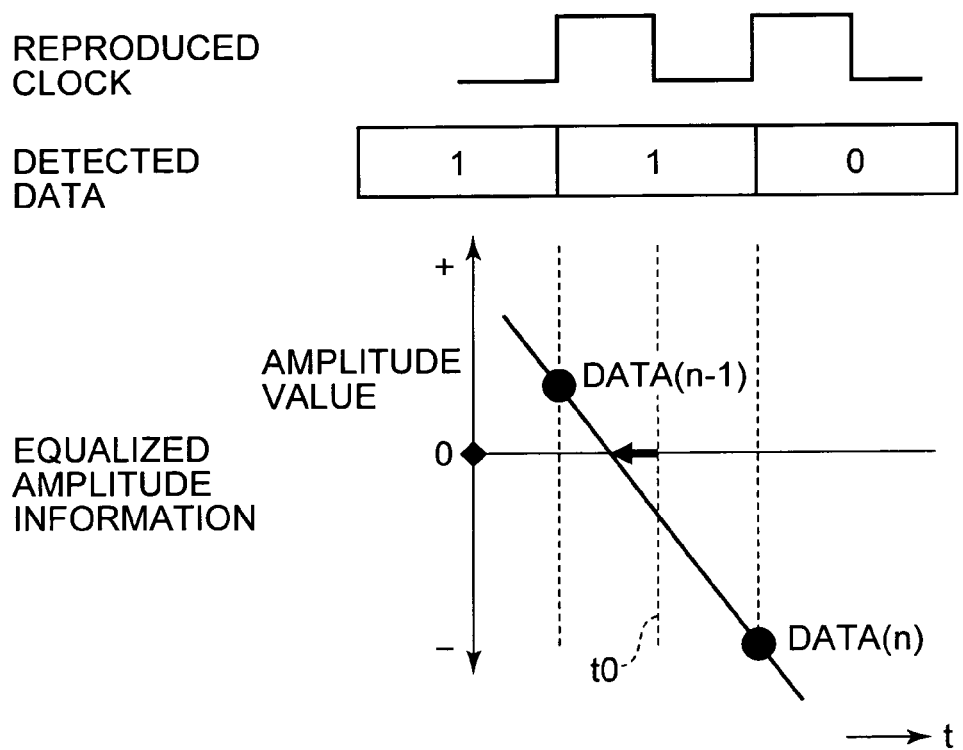
FIG. 4 It is a diagram for explaining phase error detection.

Referring next to FIG. 4, an example of phase error detection in the phase error detecting section 51 will be described.

FIG. 4 is a diagram showing a signal waveform of reproduced clocks, detected data which can take either "1" or "0", and values of equalized amplitude information, with a time axis t extending in the horizontal direction. In FIG. 4, data(n−1) and data(n) are amplitude values of the equalized amplitude information at the rises of the reproduced clocks, respectively. The "data(n)" is the amplitude value of the equalized amplitude information next to the "data(n−1)".

A phase error is calculated by, e.g., the following equation (1).

$$\text{Phase error}=[\text{data}(n)+\text{data}(n-1)]/[\text{data}(n)-\text{data}(n-1)] \quad (1)$$

From the equation (1), a deviation amount in terms of time of the equalized amplitude information from each corresponding reproduced clock can be calculated.

In a case where there is no phase error, a time when signs of equalized amplitude information switch coincides with a time t0 at which "1" switches to "0" in the corresponding reproduced clock. A difference (error) between the time t0 at which "1" switches to "0" in the reproduced clock and the time at which the polarities (signs) of the equalized amplitude information switch is a phase error. The arrow in FIG. 4 represents a phase error.

That is, as shown in FIG. 4, in one cycle of the reproduced clock, detected data takes either one of the values "1" and "0". For example, one cycle of the reproduced clock is defined to extend from a rise of a reproduced clock to the next rise of the reproduced clock. It can be said that the rises of reproduced clocks represent the start time and the end time of one cycle of the reproduced clock. In this case, a reproduced clock falls at the time t0 at which a ½ cycle of the reproduced clock (half cycle) has elapsed from the start time of one cycle of the reproduced clock. The time t0 at which a ½ cycle of the reproduced clock has elapsed from the start time of one cycle of the reproduced clock will hereinafter be referred to as "half cycle point".

Here, a relationship between time and amplitude value of equalized amplitude information will be considered. In the lower side of FIG. 4, the horizontal direction represents time, and the vertical direction represents amplitude value of equalized amplitude information.

In a case where no error is contained in equalized amplitude information, i.e., where equalized amplitude information is ideal, in a coordinate space having time and amplitude value of equalized amplitude information as its coordinate axes, respectively, a straight line connecting a point specified by the start time of a certain cycle of the reproduced clock and the amplitude value data(n−1) of the equalized amplitude information at that start time, with a point specified by the start time of a next cycle of the reproduced clock and the amplitude value data(n) of the equalized amplitude information at the start time of the next cycle passes through a point specified by the half cycle point and an amplitude value which is 0.

That is, in a case where no error is contained in the equalized amplitude information, this straight line and a straight line representing the amplitude value which is 0 cross at the half cycle point (time t0).

In a case where an error is contained in equalized amplitude information, in a coordinate space having time and amplitude value of equalized amplitude information as its coordinate axes, respectively, a straight line connecting a point specified by the start time of a certain cycle of the reproduced clock and the amplitude value data(n−1) of the equalized amplitude information at that start time, with a point specified by the start time of a next cycle of the reproduced clock and the amplitude value data(n) of the equalized amplitude information at the start time of the next cycle does not pass through a point specified by the half cycle point and an amplitude value which is 0. In a case where an error is contained in the equalized amplitude information, the point at which this straight line crosses the straight line representing the amplitude value which is 0 deviates from the half cycle point (time t0) in the time direction.

The point at which this straight line crosses the straight line representing the amplitude value which is 0 in the coordinate space having time and amplitude value of equalized amplitude information as its coordinate axes, respectively, will hereinafter be referred to as "phase error point".

That is, the phase error detecting section 51 detects an error (e.g., the arrow in FIG. 4) between the error reference point and the phase error point as a phase error.

Here, it is necessary that the polarity of the amplitude value data(n−1) of the equalized amplitude information and the polarity of the amplitude value data(n) of the equalized amplitude information, in a case where a phase error has been detected, are different.

Note that in the equation (1), the time axis direction may be arbitrarily selectable. In this case, data(n) and data(n−1) in the denominator of the equation (1) may be switched in sequence.

Moreover, the denominator of the equation (1) may take a value obtained by multiplying the polarity ("+" or "−") of data(n) or data(n−1) with a constant. For example, sign (data (n−1))×2, which is obtained by multiplying the polarity of data(n−1) with a constant which is 2, may be the denominator of the equation (1). At this time, a phase error is calculated by the following equation (2).

$$\text{Phase error} = [data(n) + data(n-1)] / [[\text{sign}(data(n-1)) \times 2] \quad (2)$$

Provided that sign(a) is a function representing the sign of "a", and when a>=0, sign(a)=1, and when a<0, sign(a)=−1.

Furthermore, for phase error detection, a phase error detected by the phase error detecting section 41 of FIG. 2 may be used, instead of that detected by the phase error detecting section 51. In this case, the phase error integrating section 41 supplies a phase error signal to the bit slip correcting section 53, and the bit slip correcting section 53 corrects an error caused by a bit slip on the basis of the phase error signal supplied from the phase error detecting section 41.

Note that the phase error detecting section 51 detects a phase error signal on the basis of equalized amplitude information and the corresponding reproduced clock. By additionally using detected data outputted from the data detecting section 35, a more accurate phase error can be detected. This is because the detected data outputted from the data detecting section 35 has its error corrected, and this allows the phase error detecting section 51 to detect the phase error between the equalized amplitude information and the corresponding reproduced clock by referring to the time at which the polarities of the detected data thus error-corrected switch.

Moreover, a method of detecting a phase error in the phase error detecting section 51 is not limited to the method described with reference to FIG. 4, but may include other schemes as well. For example, the phase error detecting section 51 may classify equalized amplitude information, and detect a phase error on the basis of the classified equalized amplitude information.

Figure 5:
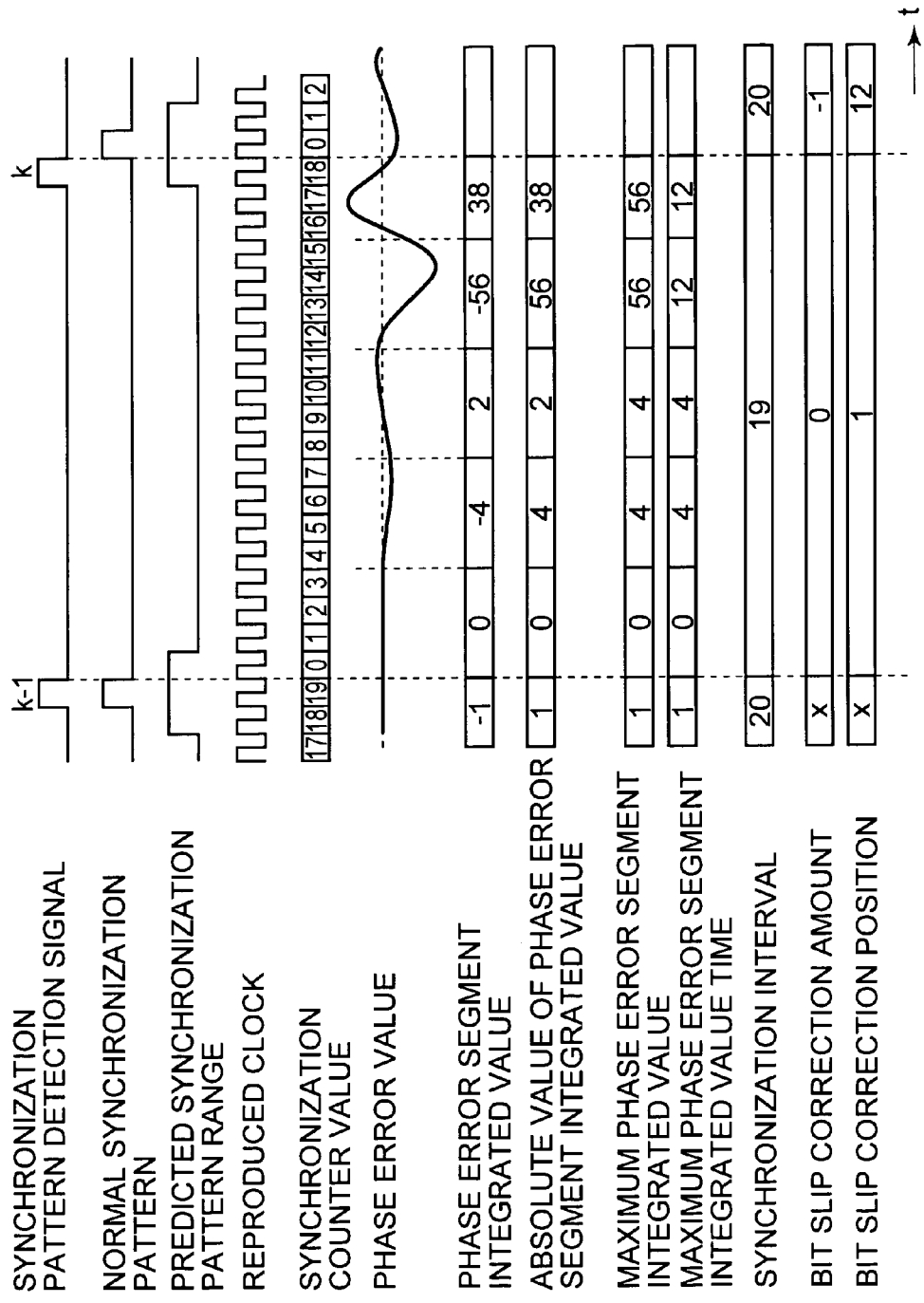
FIG. 5 It is a timing chart showing detection of a deviation amount and a time at which the deviation is predicted to have occurred, with respect to successive synchronization patterns, in a case where a bit slip has occurred.

FIG. 5 is a timing chart showing detection of a deviation amount and detection of a time at which the deviation is predicted to have occurred, with respect to successive synchronization patterns, in a case where a bit slip has occurred.

"Synchronization pattern detection signal" is a signal outputted from the synchronization detecting section 52, and indicating that a synchronization pattern has been detected. That is, for example, a time at which a synchronization pattern detection signal switches from 0 to 1 is a time at which a synchronization pattern has been detected.

"Normal synchronization pattern" represents a normal synchronization pattern defined for each recording medium format. That is, an interval between normal synchronization patterns represents a predetermined period which is compared with an interval between synchronization pattern detection signals.

In the example of synchronization pattern detection signals and normal synchronization patterns shown in FIG. 5, on the left side of the figure, no bit slip has occurred in the preceding period, and thus a synchronization pattern detection signal time coincides with a normal synchronization pattern time. By contrast, on the right side of the figure, a bit slip has occurred in the preceding period, and thus the synchronization pattern detection signal deviates from the corresponding normal synchronization pattern. Note that, in a case where no bit slip occurs, a synchronization pattern detection signal is detected at a time at which a later-described synchronization counter value equals 19.

"Predicted synchronization pattern range" represents a range within which the detection range setting section 84 detects a synchronization pattern. For example, in a case of having detected a synchronization pattern from detected data within a period in which the predicted synchronization pattern range equals 1, the synchronization detecting section 52 switches a synchronization pattern detecting signal from 0 to 1, but in a case of having detected a synchronization pattern from detected data within a period in which the predicted synchronization pattern range equals 0, the synchronization detecting section 52 leaves the synchronization pattern detection signal unswitched.

"Synchronization counter value" is a value counted by the synchronization pattern interval counter 91. For example, the synchronization pattern interval counter 91 sets the synchronization counter value to 0 when a synchronization pattern detection signal switches from 0 to 1 (including a predetermined delay), i.e., upon rise of the synchronization pattern detection signal. In an example shown in FIG. 5, there is a delay equal to one cycle of the reproduced clock from the rise of a synchronization pattern detection signal to the setting of the synchronization counter value to 0. The synchronization pattern interval counter 91 increments the synchronization counter value in synchronism with a reproduced clock.

In the example of the synchronization counter values shown in FIG. 5, when the synchronization counter value equals 18, the synchronization pattern detection signal has risen as shown on the right side of the figure, whereby the synchronization counter value switches from 18 to 0.

"Phase error segment integrated value" is an integrated value of phase error values in each of segments obtained by dividing a normal synchronization pattern interval by a predetermined number. For example, in a case where one of the segments obtained by dividing the normal synchronization pattern interval by the predetermined number equals four cycles of the reproduced clock, the phase error integrating section 92 integrates phase error values in each segment corresponding to four cycles of the reproduced clock, whereby to calculate a phase error segment integrated value.

In the example shown in FIG. 5, phase errors are integrated in each of segments obtained by dividing the normal synchronization pattern interval by 5. After the synchronization pattern detection signal has switched from 0 to 1, in a first segment which is the initial segment, a phase error segment integrated value which is 0 is calculated, and in a second segment succeeding the first segment, a phase error segment integrated value which is −4 is calculated. Furthermore, in a third segment succeeding the second segment, a phase error segment integrated value which is 2 is calculated, and in a fourth segment succeeding the third segment, a phase error segment integrated value which is −56 is calculated, and further in a fifth segment succeeding the fourth segment, a phase error segment integrated value which is 38 is calculated.

The absolute values of the phase error segment integrated values in the respective segments are calculated by the bit slip judging section 81.

In the example shown in FIG. 5, in the first segment, the absolute value of its phase error segment integrated value, which is 0, is calculated, and in the second segment, the absolute value of its phase error segment integrated value, which is 4, is calculated. Furthermore, in the third segment, the absolute value of its phase error segment integrated value, which is 2, is calculated, and in the fourth segment, the absolute value of its phase error segment integrated value, which is 56, is calculated, and further in the fifth segment, the absolute value of its phase error segment integrated value, which is 38, is calculated.

Furthermore, maximum phase error segment integrated values in the respective segments are calculated by the bit slip judging section 81.

In the example shown in FIG. 5, in the first segment, the initial value 0 is compared with the absolute value of the phase error segment integrated value, which is 0, to calculate a maximum phase error segment integrated value resulting in 0. In the second segment, the maximum phase error segment integrated value in the first segment, which is 0, is compared with the absolute value of the phase error segment integrated value in the second segment, which is 4, to calculate a maximum phase error segment integrated value resulting in 4. Furthermore, in the third segment, the maximum phase error segment integrated value in the second segment, which is 4, is compared with the absolute value of the phase error segment integrated value in the third segment, which is 2, to calculate the maximum phase error segment integrated value resulting in 4, and in the fourth segment, the maximum phase error segment integrated value in the third segment, which is 4, is compared with the absolute value of the phase error segment integrated value in the fourth segment, which is 56, to calculate a maximum phase error segment integrated value resulting in 56. Moreover, in the fifth segment, the maximum phase error segment integrated value in the fourth segment, which is 56, is compared with the absolute value of the phase error segment integrated value in the fifth segment, which is 38, to calculate the maximum phase error segment integrated value resulting in 56.

"Maximum phase error segment integrated value time" is the heading synchronization counter value in a segment in which the absolute value of a phase error segment integrated value is selected as a maximum phase error segment integrated value. For example, in a case where each of segments obtained by dividing a normal synchronization pattern interval by a predetermined number equals four cycles of the reproduced clock, the maximum phase error time storing section 93 stores the heading synchronization counter value in a segment having the maximum phase error segment integrated value, as to the segments each corresponding to four cycles of the reproduced clock.

Note that the maximum phase error segment integrated value time is not limited to the heading synchronization counter value in a segment in which the absolute value of a phase error segment integrated value is selected as a maximum phase error segment integrated value, but may also include the last synchronization counter value in the segment selected as having the maximum phase error segment integrated value, the median synchronization counter value in the segment selected as having the maximum phase error segment integrated value, or an arbitrary synchronization counter value in the segment selected as having the maximum phase error segment integrated value.

In the example shown in FIG. 5, in the first segment, the heading synchronization counter value in the first segment having a maximum phase error segment integrated value is acquired, to store a maximum phase error segment integrated value time which is 0 in the maximum phase error time storing section 93. In the second segment, the absolute value of its phase error segment integrated value is selected as a maximum phase error segment integrated value, and thus the heading synchronization counter value in the second segment is acquired, to store a maximum phase error segment integrated value time which is 4 in the maximum phase error time storing section 93.

Furthermore, in the third segment, the absolute value of its phase error segment integrated value is not selected as a maximum phase error segment integrated value, and thus the maximum phase error segment integrated value time stored in the maximum phase error time storing section 93 remains unchanged. In the fourth segment, the absolute value of its phase error segment integrated value is selected as a maximum phase error segment integrated value, and thus the heading synchronization counter value in the fourth segment is acquired, to store a maximum phase error segment integrated value time which is 12 in the maximum phase error time storing section 93. And in the fifth segment, the absolute value of its phase error segment integrated value is not selected as a maximum phase error segment integrated value, and thus the maximum phase error segment integrated value time stored in the maximum phase error time storing section 93 remains unchanged.

"Synchronization interval" equals the number of reproduced clocks between two successive synchronization pattern detection signals. That is, the synchronization interval corresponds to a synchronization counter value at the rise of a synchronization pattern detection signal. In the example shown in FIG. 5, since the starting synchronization counter value is 0, the synchronization interval equals a value obtained by adding 1 to a synchronization counter value at the rise of a synchronization pattern detection signal.

An interval between a synchronization pattern at a time n and a synchronization pattern at a time m will hereinafter be referred to as "synchronization pattern interval (n, m)".

In the example shown in FIG. 5, a synchronization interval which is 19 is calculated in a synchronization pattern interval (k−1, k). Note that a synchronization interval which is 20 is calculated in a synchronization pattern interval (k−2, k−1), and that a synchronization interval which is 20 is calculated in a synchronization pattern interval (k, k+1).

"Bit slip correction amount" is a difference between a period defined by synchronization pattern detection signals and a period defined by normal synchronization patterns, using reproduced clocks as a reference. In other words, it is a difference between a total synchronization counter value obtained in a normal synchronization pattern and a synchronization counter value immediately before the counter is reset by the rise of a synchronization pattern detection signal.

That is, the bit slip correction amount represents a deviation between a reproduced clock and the corresponding equalized amplitude information, which has been caused by a bit slip and which is measured using a cycle of the reproduced clock as a reference.

In the example shown in FIG. 5, bit slip correction amounts are calculated as follows. In the synchronization pattern interval (k−1, k), i.e., at a time k−1, a bit slip correction amount which is 0 is calculated, and in the synchronization pattern interval (k, k+1), the value 20 which is a normal synchronization interval is subtracted from a synchronization interval which is 19, whereby to calculate a bit slip correction amount which is −1 at a time k.

"Bit slip correction position" is a maximum phase error segment integrated value time stored in the maximum phase error time storing section 93 upon rise of a synchronization pattern detection signal.

That is, the bit slip correction position represents a time for a segment in which a deviation of detected data (equalized amplitude information) is assumed to have occurred with respect to the corresponding reproduced clock.

In the example shown in FIG. 5, bit slip correction positions are calculated as follows. At the time k−1, a bit slip correction position which is 1 is calculated, and at the time k, a bit slip correction position which is 12 is calculated.

In the example shown in FIG. 5, in the synchronization pattern interval (k, k+1), the bit slip correction amount which is −1 and the bit slip correction position which is 12 are supplied to the FIFO control section 82 as the bit slip correction information. Moreover, the bit slip judging section 81 judges that a bit slip has occurred since the bit slip correction amount, i.e., the deviation amount is other than 0.

Note that in the synchronization pattern interval (k−1, k), the bit slip correction amount equals 0 and the bit slip correction position equals 1. In this case, however, no bit slip correction is made, since the bit slip correction amount is 0, although the bit slip correction position takes a certain value.

FIG. 6 is a diagram showing a method of calculating a bit slip occurrence position (a time for a segment in which a deviation of detected data (equalized amplitude information) is assumed to have occurred with respect to the corresponding reproduced clock), in a case where a bit slip has occurred.

In FIG. 6, a mutual relationship is shown among "phase error segment integrated value", "detected data", "absolute value of phase error segment integrated value", "detected data after correction" and "detected data range for correction" in segments N−1, N and N+1 each defined by synchronization pattern detection signals. Moreover, in an example shown in FIG. 6, a bit slip has occurred at a time A.

A waveform 211 represents integrated values of phase errors, calculated by the phase error integrating section 92. Rectangles shown in a manner overlapping with the waveform 211 respectively represent integrated values of phase errors in segments.

The detected data is detected by the data detecting section 35. In the example shown in FIG. 6, L channel bit detected data is arranged between two normal synchronization patterns in a case where no bit slip occurs. In a case where a bit slip has occurred, detected data either above or below L is arranged between two synchronization patterns.

In the example shown in FIG. 6, a bit slip has occurred in the segment N, and thus detected data in the segment N equals (L+1) channel bits.

Since the absolute value of a phase error segment integrated value is an absolute value as to a phase error segment integrated value, a phase error segment integrated value which is a negative value becomes a positive value with its sign inverted. Furthermore, through a comparison among the absolute values of phase error segment integrated values, the absolute value of a phase error segment integrated value in a segment denoted by B becomes the maximum phase error segment integrated value, and thus (a time for) the segment denoted by B becomes the bit slip correction position.

The detected data is corrected into data having as many detected data bits as those to be arranged between two normal synchronization patterns in a case where no bit slip occurs. In the example shown in FIG. 6, the "detected data after correction" is corrected so as to have L channel bits.

As a result of this correction, the detected data from the time for the segment denoted by B to the end of the segment N are corrected. In segments 212 with large phase errors, the reproduced signals themselves have changed, and thus, even if a correction is made in the time direction, normal detected data cannot be obtained. In segments 213 with small phase errors, the reproduced signals themselves have recovered, and thus normal detected data can be obtained by a correction in the time direction.

In this way, in a case where a burst error has occurred and a bit slip has occurred due to the burst error, the reproducing apparatus of the present invention can correct an error preceding a synchronization pattern which is detected after the bit slip.

Next, insertion of a synchronization pattern detection signal will be described. Once a burst error has occurred, detection of a synchronization pattern itself may become difficult in some cases. In a case where synchronization patterns have been detected successively in a predetermined period, the reproducing apparatus moves to a synchronization pattern interpolation mode, to insert a synchronization pattern detection signal at a predetermined time.

Figure 7:
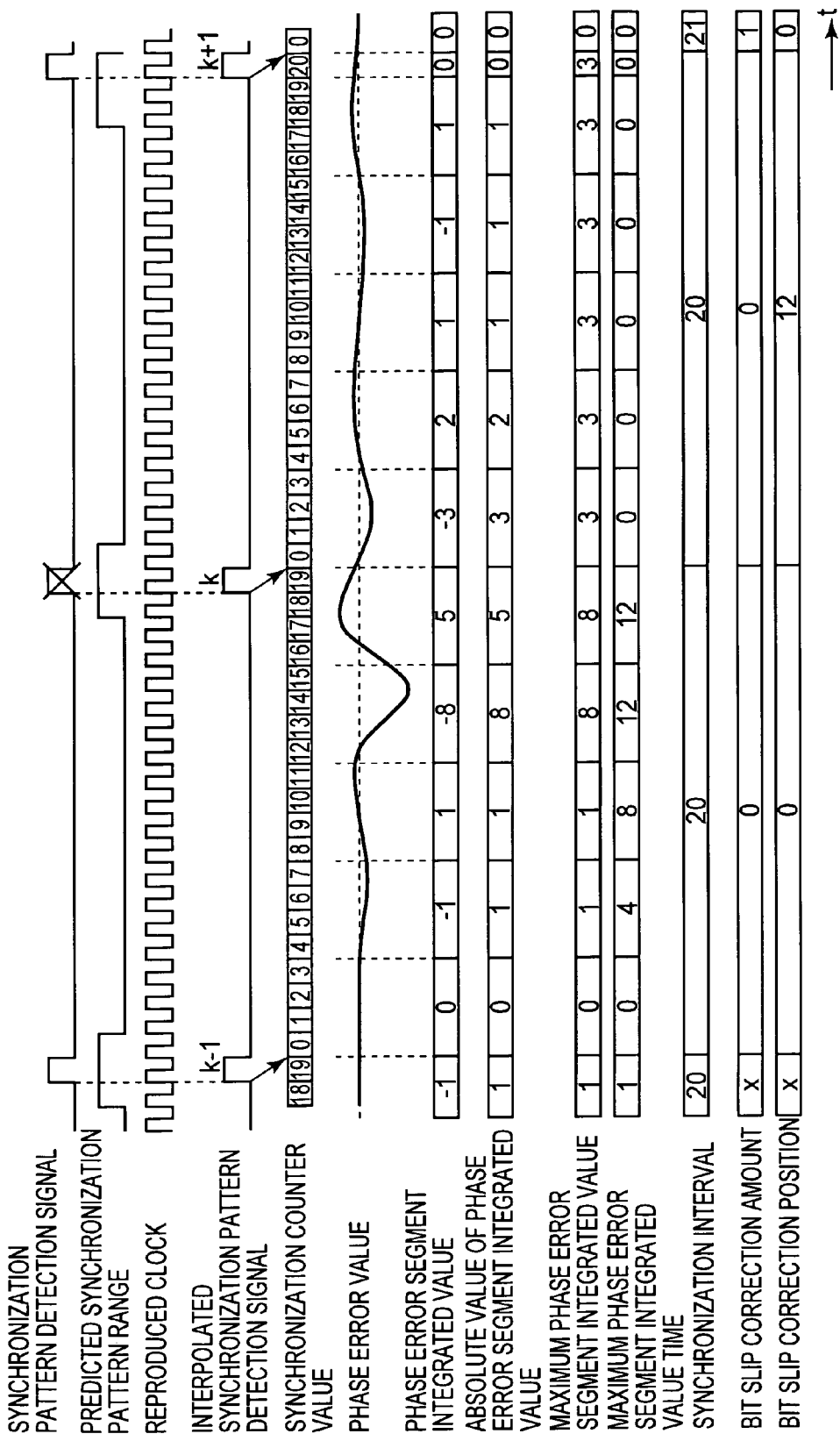
FIG. 7 It is a timing chart for explaining insertion of a synchronization pattern detection signal, in a case where no synchronization pattern has been detected in a synchronization pattern interpolation mode.

FIG. 7 is a timing chart for explaining insertion of a synchronization pattern detection signal in a case where no synchronization pattern has been detected in the synchronization pattern interpolation mode.

"Synchronization pattern detection signal" to "reproduced clock", and "synchronization counter value" to "bit slip correction position" in FIG. 7 are similar to those in the case shown in FIG. 5, and thus their description will be omitted whenever appropriate.

In an example shown in FIG. 7, a synchronization pattern at a time k is not detected, and thus no synchronization pattern detection signal rises at the time k. A mark "x" in FIG. 7 indicates that a synchronization pattern detection signal does not rise.

In the synchronization pattern interpolation mode, in a case where no synchronization pattern is detected from detected data during a period in which the predicted synchronization pattern range equals 1, the synchronization pattern detection signal inserting section 85 inserts a synchronization pattern detection signal into the middle of the predicted synchronization pattern range set by the detection range setting section 84, i.e., at a time coinciding with a normal synchronization pattern.

Note that the synchronization detecting section 52 to the bit slip correcting section 53 need a predetermined delay time for their signal processing. Thus, the synchronization pattern detection signal inserting section 85 inserts a synchronization pattern detection signal with the corresponding signals keeping time relations to one another by utilizing that delay time.

A "synchronization pattern detection signal after interpolation" shown in FIG. 7 represents the synchronization pattern detection signal which has been inserted at the time k.

Here, a procedure for inserting a synchronization pattern will be described. The synchronization detecting section 52 first finds a synchronization pattern itself from detected data (hereinafter referred to as "synchronization pattern interpolation release mode"). In a case where at least one synchronization pattern has been detected, if a next synchronization pattern is found "within margins on both sides of" a regular clock count, i.e., within a predetermined range, in accordance with a recording medium format, it is determined whether or not the synchronization pattern is valid by multiplication of the occurring probabilities of both the synchronization pattern and its synchronization pattern position (time). And in a case where the synchronization pattern is determined to be valid, a next synchronization pattern is found using that synchronization pattern position (time) as a reference. The term "within margins on both sides of" is generally referred to as a "detection window", and is used to allow for some deviation from regular clocks (normal interval) in a synchronization pattern interval, e.g., where a bit slip has occurred at some point along the processing.

And in a case where synchronization patterns have been found as many as N times ("N" is a set value defined by an actual circuit or the specification of a product) in succession, if, after narrowing the detection window to some extent, no synchronization pattern is found in that detection window, the synchronization detecting section 52 inserts a synchronization pattern (actually, a synchronization pattern detection signal) into the middle of the window, and thereafter continues the synchronization pattern detection (i.e., moves to the synchronization pattern interpolation mode). However, in a case where no synchronization pattern has been found as many as M times ("M" is a set value defined by the actual circuit or the specification of the product) in succession, the synchronization detecting section 52 returns to the synchronization pattern interpolation release mode.

In the example shown in FIG. 7, the reproducing apparatus is in the synchronization pattern interpolation mode, and thus a synchronization pattern detection signal is inserted at the time k.

In the example shown in FIG. 7, phase error segment integrated values are obtained as follows. In segments obtained by dividing a "synchronization pattern interval after interpolation" (k−1, k) by 5, phase errors are integrated, and in segments obtained by dividing a "synchronization pattern interval after interpolation" (k, k+1) by 6, phase errors are integrated.

After a "synchronization pattern detection signal after interpolation" has switched from 0 to 1 in the "synchronization pattern interval after interpolation" (k−1, k), a phase error segment integrated value which is 0 is calculated in a first segment which is the initial segment, and a phase error segment integrated value which is −1 is calculated in a second segment succeeding the first segment. Furthermore, a phase error segment integrated value which is 1 is calculated in a third segment succeeding the second segment, a phase error segment integrated value which is −8 is calculated in a fourth segment succeeding the third segment, and a phase error segment integrated value which is 5 is calculated in a fifth segment succeeding the fourth segment.

Furthermore, after a "synchronization pattern detection signal after interpolation" has switched from 0 to 1 in the "synchronization pattern interval after interpolation" (k, k+1), in a first segment which is the initial segment, a phase error segment integrated value which is −3 is calculated, and in a second segment succeeding the first segment, a phase error segment integrated value which is 2 is calculated. Furthermore, a phase error segment integrated value which is 1 is calculated in a third segment succeeding the second segment, a phase error segment integrated value which is −1 is calculated in a fourth segment succeeding the third segment, and a phase error segment integrated value which is 1 is calculated in a fifth segment succeeding the fourth segment. Moreover, due to a bit slip having occurred, in a sixth segment succeeding the fifth segment, a phase error integrated value which is 0 is calculated.

As the absolute values of the phase error segment integrated values, in the synchronization pattern interval (k−1, k) in the example shown in FIG. 7, the absolute value of its phase error segment integrated value, which is 0, is calculated in the first segment, and the absolute value of its phase error segment integrated value, which is 1, is calculated in the second segment. Furthermore, the absolute value of its phase error segment integrated value, which is 1, is calculated in the third segment, the absolute value of its phase error segment integrated value, which is 8, is calculated in the fourth segment, and the absolute value of its phase error segment integrated value, which is 5, is calculated in the fifth segment.

Furthermore, in the synchronization pattern interval (k, k+1), the absolute value of its phase error segment integrated value, which is 3, is calculated in the first segment, the absolute value of its phase error segment integrated value, which is 2, is calculated in the second segment, and the absolute value of its phase error segment integrated value, which is 1, is calculated in the third segment. And the absolute value of its phase error segment integrated value, which is 1, is calculated in the fourth segment, the absolute value of its phase error segment integrated value, which is 1, is calculated in the fifth segment, and the absolute value of its phase error segment integrated value, which is 0, is calculated in the sixth segment.

As maximum phase error segment integrated values, in the synchronization pattern interval (k−1, k) in the example shown in FIG. 7, the initial value 0 is compared with the absolute value of its phase error segment integrated value, which is 0, to calculate a maximum phase error segment integrated value which is 0 in the first segment. In the second segment, the maximum phase error segment integrated value in the first segment, which is 0, is compared with the absolute value of the phase error segment integrated value in the second segment, which is 1, to calculate a maximum phase error segment integrated value which is 1. Furthermore, in the third segment, the maximum phase error segment integrated value in the second segment, which is 1, is compared with the absolute value of the phase error segment integrated value in the third segment, which is 1, to calculate the maximum phase error segment integrated value which is 1, and in the fourth segment, the maximum phase error segment integrated value in the third segment, which is 1, is compared with the absolute value of the phase error segment integrated value in the fourth segment, which is 8, to calculate a maximum phase error segment integrated value which is 8. Moreover, in the fifth segment, the maximum phase error segment integrated value in the fourth segment, which is 8, is compared with the absolute value of the phase error segment integrated value in the fifth segment, which is 5, to calculate the maximum phase error segment integrated value which is 8.

Furthermore, in the synchronization pattern interval (k, k+1), the initial value 0 is compared with the absolute value of its phase error segment integrated value, which is 3, to calculate a maximum phase error segment integrated value which is 3 in the first segment. In the second segment, the maximum phase error segment integrated value in the first segment, which is 3, is compared with the absolute value of the phase error segment integrated value in the second segment, which is 2, to calculate the maximum phase error segment integrated value which is 3. Furthermore, in the third segment, the maximum phase error segment integrated value in the second segment, which is 3, is compared with the absolute value of the phase error segment integrated value in the third segment, which is 1, to calculate the maximum phase error segment integrated value which is 3, and in the fourth segment, the maximum phase error segment integrated value in the third segment, which is 3, is compared with the absolute value of the phase error segment integrated value in the fourth segment, which is 1, to calculate the maximum phase error segment integrated value, which is 3.

Moreover, in the fifth segment, the maximum phase error segment integrated value in the fourth segment, which is 3, is compared with the absolute value of the phase error segment integrated value in the fifth segment, which is 1, to calculate the maximum phase error segment integrated value which is 3, and in the sixth segment, the maximum phase error segment integrated value in the fifth segment, which is 3, is compared with the absolute value of the phase error segment integrated value in the sixth segment, which is 0, to calculate the maximum phase error segment integrated value which is 3.

In the synchronization pattern interval (k−1, k) in the example shown in FIG. 7, as maximum phase error segment integrated value times, in the example shown in FIG. 7, the heading synchronization counter value in the first segment having a maximum phase error segment integrated value is acquired, to store a maximum phase error segment integrated value time which is 0 in the maximum phase error time storing section 93 in the first segment. In the second segment, the absolute value of a phase error segment integrated value error is selected as a maximum phase error segment integrated value, and thus the heading synchronization counter value in the second segment is acquired, to store a maximum phase error segment integrated value time which is 4 in the maximum phase error time storing section.

Furthermore, in the third segment, the absolute value of a phase error segment integrated value error is selected as a maximum phase error segment integrated value, and thus the heading synchronization counter value in the third segment having the maximum phase error segment integrated value is acquired, to store a maximum phase error segment integrated value time which is 8 in the maximum phase error time storing section. In the fourth segment, the absolute value of a phase error segment integrated value error is selected as a maximum phase error segment integrated value, and thus the heading synchronization counter value in the fourth segment having the maximum phase error segment integrated value is acquired, to store a maximum phase error segment integrated value time which is 12 in the maximum phase error time storing section. And in the fifth segment, the absolute value of a phase error segment integrated value error is not selected as a maximum phase error segment integrated value, and thus the maximum phase error segment integrated value time stored in the maximum phase error time storing section 93 remains unchanged.

Furthermore, in the synchronization pattern interval (k, k+1) in the example shown in FIG. 7, as maximum phase error segment integrated value times, in the first segment, the heading synchronization counter value in the first segment having a maximum phase error segment integrated value is acquired, to store a maximum phase error segment integrated value time which is 0 in the maximum phase error time storing section 93. In the second segment, the absolute value of a phase error segment integrated value error is not selected as a maximum phase error segment integrated value, and thus the maximum phase error segment integrated value time stored in the maximum phase error time storing section 93 remains unchanged. In the third segment, the absolute value of a phase error segment integrated value error is not selected as a maximum phase error segment integrated value, and thus the maximum phase error segment integrated value time stored in the maximum phase error time storing section 93 remains unchanged.

In the fourth segment, the absolute value of a phase error segment integrated value error is not selected as a maximum phase error segment integrated value, and thus the maximum phase error segment integrated value time stored in the maximum phase error time storing section 93 remains unchanged. In the fifth segment, the absolute value of a phase error segment integrated value error is not selected as a maximum phase error segment integrated value, and thus the maximum phase error segment integrated value time stored in the maximum phase error time storing section 93 remains unchanged. And in the sixth segment, the absolute value of a phase error segment integrated value error is not selected as a maximum phase error segment integrated value, and thus the maximum phase error segment integrated value time stored in the maximum phase error time storing section 93 remains unchanged.

Note that in a case where maximum phase error segment integrated values are equal in successive segments, which one of the former and latter maximum phase error segment integrated values should prevail is determined by setting. In the example shown in FIG. 7, the maximum phase error segment integrated values in the second and third segments are 1, and the maximum phase error segment integrated value time in the third segment is 8. Here, if the maximum phase error segment integrated values are equal, it is set such that the latter maximum phase error segment integrated value should prevail, and thus the value in the third segment prevails over that in the second segment.

In the example shown in FIG. 7, synchronization intervals are calculated as follows: a synchronization interval which is 20 is calculated in the "synchronization pattern interval after correction" (k−1, k), a synchronization interval which is 20 is calculated in the "synchronization pattern interval after correction" (k, k+1), and a synchronization interval which is 21 is calculated in a "synchronization pattern interval after correction" (k+1, k+2).

In the example shown in FIG. 7, bit slip correction amounts are calculated as follows: a bit slip correction amount which is 0 is calculated in the "synchronization pattern interval after correction" (k−1, k), i.e., at the time k−1, and a bit slip correction amount which is 0 is calculated in the "synchronization pattern interval after correction" (k, k+1), i.e., at the time k. Moreover, in the "synchronization pattern interval after correction" (k+1, k+2), i.e., at a time k+1, a bit slip correction amount which is 1 is calculated.

Here, for example, at the time k, the synchronization pattern detection signal inserting section 85 inserts the synchronization pattern detection signal at the predetermined time, and thus 0 is calculated as the bit slip correction amount at the time k.

In the example shown in FIG. 7, bit slip correction positions are calculated as follows: a bit slip correction position which is 0 is calculated at the time k−1, a bit slip correction position which is 12 is calculated at the time k, and a bit slip correction position which is 0 is calculated at the time k+1.

In a case where the synchronization pattern detection signal inserting section 85 has inserted a synchronization pattern detection signal at a predetermined time, a bit slip correction is made at a time at which a first synchronization pattern detection signal is detected after the synchronization pattern detection signal has been inserted. In the example shown in FIG. 7, at the time k+1, which is after the time k at which the synchronization pattern detection signal has been inserted, a bit slip correction is made. And the bit slip correction amount which is 1 and the bit slip correction position which is 12 are supplied to the FIFO control section 82 as the bit slip correction information. In this case, the bit slip judging section 81 judges that a bit slip has occurred because the bit slip correction amount, i.e., the deviation amount is other than 0.

Note that at the time k, the bit slip correction amount equals 0 and the bit slip correction position equals 12. In this case, however, no bit slip correction is made, since the bit slip correction amount is 0, although the bit slip correction position takes a certain value.

FIG. 8 is a diagram showing a method of calculating a bit slip occurrence position in a case where a bit slip has occurred and no synchronization pattern has been detected.

In FIG. 8, a mutual relationship is shown among "phase error segment integrated value", "detected data", "absolute value of phase error segment integrated value", "detected data after correction" and "detected data range for correction" in segments N−1, N and N+1 each defined by synchronization pattern detection signals.

"Phase error segment integrated value" to "detected data range for correction" in FIG. 8 are similar to those in the case shown in FIG. 6, and thus their description will be omitted whenever appropriate.

Similarly to the case shown in FIG. 6, rectangles shown in a manner overlapping with a waveform 211 respectively represent phase error segment integrated values. That is, in an example shown in FIG. 8, a synchronization pattern detection signal is inserted at a time at which the segment N switches to the segment N+1, and the rectangles shown so as to overlap with the waveform 211 respectively represent phase error integrated values in segments, in the segment N+1 after the synchronization pattern detection signal has been inserted.

As to "detected data", in the example shown in FIG. 8, detected data of L channel bit is arranged in the segment N−1 in which no bit slip has occurred. Moreover, in the segments N and N+1, a bit slip has occurred, and thus no synchronization pattern has been detected. Consequently, through the segments N and N+1, detected data of (L+L+1) channel bit is arranged.

In the example shown in FIG. 8, in the segment N+1 after the synchronization pattern detection signal has been inserted, the absolute value of a phase error segment integrated value in a segment C becomes maximum, and thus (a time for) the segment denoted by C is the bit slip correction position.

As to "detected data after interpolation", in the example shown in FIG. 8, in the segment N in which no bit slip is deemed to have occurred, detected data of L channel bit is arranged. In other words, since the synchronization pattern detection signal is inserted, detected data of L channel bit is arranged in the segment N, and the remaining detected data of (L+1) channel bit is arranged in the segment N+1.

Then, in the segment N+1, the detected data of (L+1) channel bit is changed to data of L channel bit by correction.

That is, bit slip correction is executed such that the detected data in the segment N+1 equals L channel bits.

As to "detection data range for correction", the reproduced signals themselves have changed in segments 221, and thus, even if a correction is made in the time direction, normal detected data cannot be obtained. Since the reproduced signals themselves have recovered in segments 222, normal detected data can be detected by making a correction in the time direction.

Thus, in a case where no synchronization pattern has been detected, the invention apparatus of the present invention inserts a synchronization pattern detection signal at a predetermined time, to supplement a synchronization pattern, whereby an error preceding the synchronization pattern which is detected after a bit slip can be corrected.

Referring to flowcharts of FIGS. 9 to 13, processing will be described, which is performed by the reproducing apparatus that executes a correction program by using phase errors.

Figure 9:
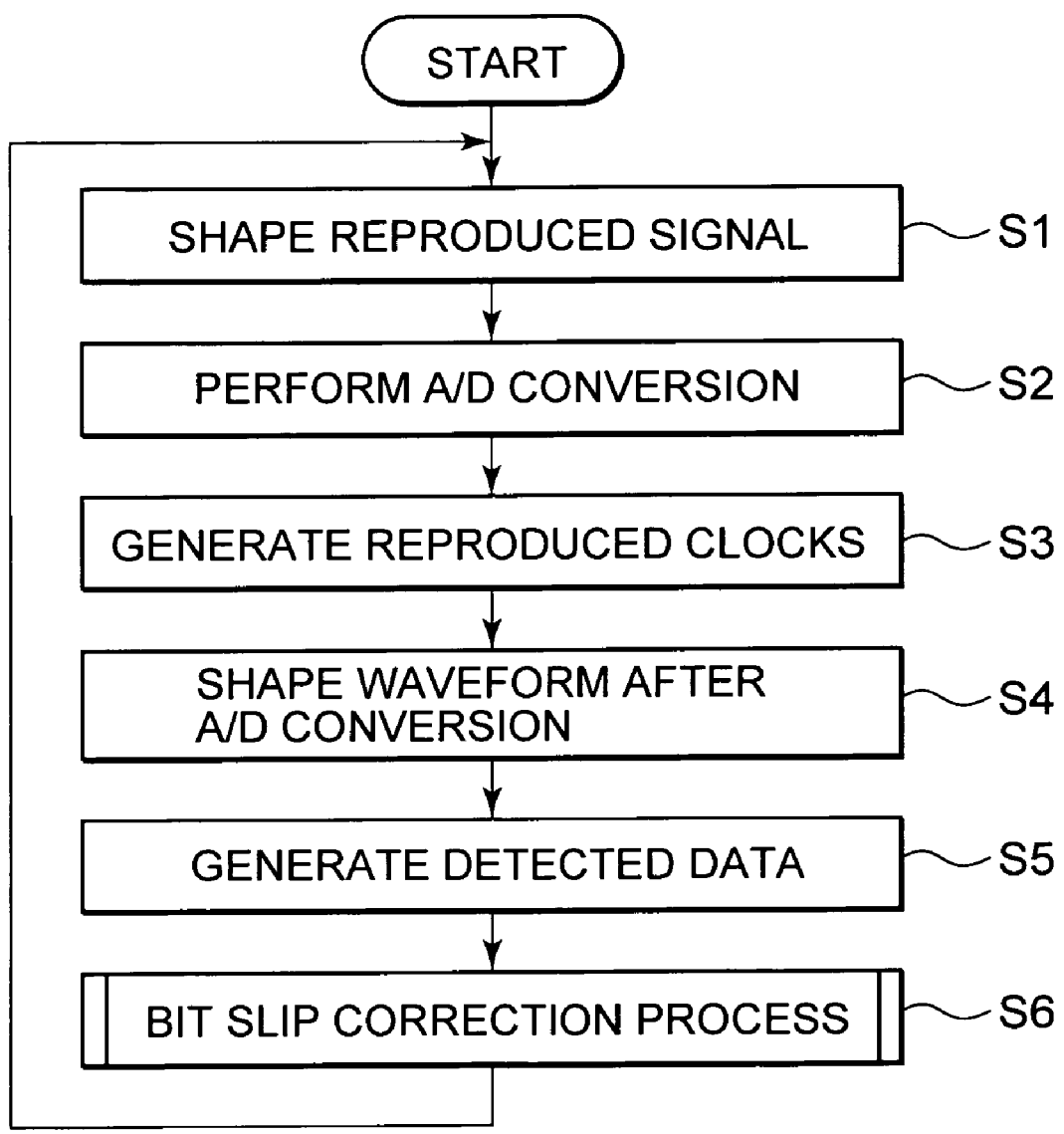
FIG. 9 It is a flowchart for explaining a reproduction process.

FIG. 9 is a flowchart for explaining a reproduction process by the reproducing apparatus.

In step S1, the equalizer 31 shapes a reproduced signal reproduced by a pickup, not shown, from a recording medium, such as an optical disc, a hard disk or a digital video cassette, which is attached, and supplies the reproduced signal to the A/D converting section 32.

In step S2, the A/D converting section 32 converts the reproduced signal, which is an analog signal supplied from the equalizer 31, into digital signals on the basis of reproduced clocks to be supplied from the clock generating section 33. The A/D converting section 32 supplies the digital signals generated by the conversion, to the clock generating section 33 and the equalizer 34.

In step S3, the clock generating section 33 includes the phase error detecting section 41 and the VCO 42, and generates the reproduced clocks from the digital signals using the PLL system.

In step S4, the equalizer 34 adjusts the edge position of each digital signal in the time direction on the basis of the reproduced clock, to shape the digital signal, and supplies the shaped digital signal to the data detecting section 35 and the error correcting section 36.

In step S5, the data detecting section 35 corrects the digital signal error by means of Viterbi decoding, and generates the error-corrected digital signal as detected data. Note that the data detecting section 35 may alternatively utilize a maximum-likelihood decoding system other than Viterbi decoding.

In step S6, a bit slip correcting process is executed, and then the process returns to step S1 to repeat the above-mentioned processing.

Details of the bit slip correcting process in step S6 will be described with reference to the flowchart of FIG. 10.

In step S21, the synchronization detecting section 52 executes a synchronization pattern detecting process.

Figure 11:
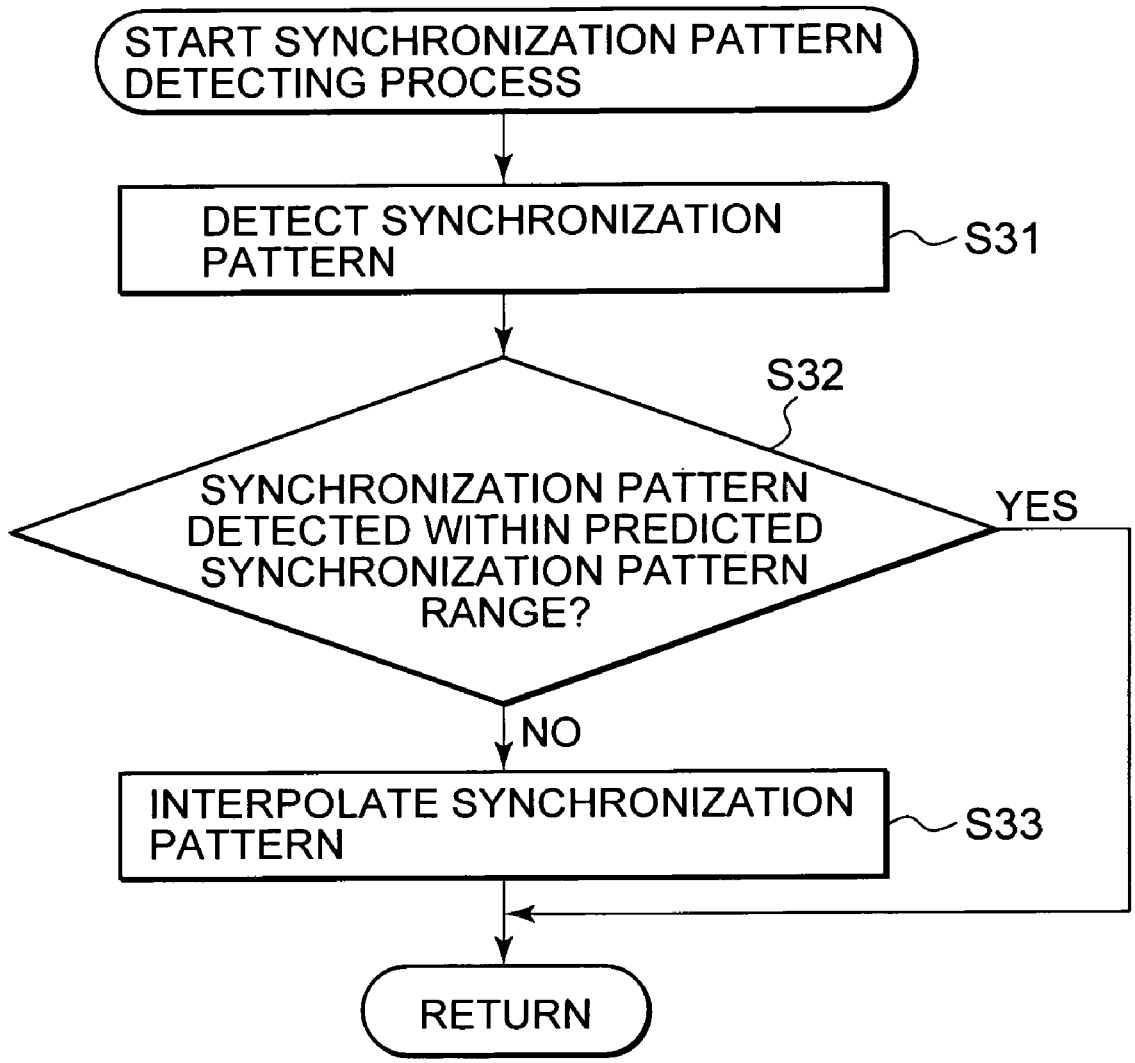
FIG. 11 It is a flowchart for explaining details of synchronization pattern detection.

Details of the synchronization pattern detecting process in the synchronization pattern interpolation mode, which corresponds to step S21, will be described with reference to the flowchart of FIG. 11.

In step S31, the synchronization detecting section 52 detects a synchronization pattern. For example, the synchronization detecting section 52 detects a synchronization pattern which has a specific bit arrangement defined by a recording medium format and which is contained in the detected data.

In step S32, the detection range setting section 84 sets a detection range from which a synchronization pattern is to be detected, on the basis of a reproduced clock signal count, and determines whether or not a synchronization pattern has been detected within the detection range. If it is determined in step S32 that no synchronization pattern has been detected, the process proceeds to step S33, in which the synchronization pattern detection signal inserting section 85 interpolates a synchronization pattern, after which the process is terminated. For example, in step S33, the synchronization pattern detection signal inserting section 85 inserts a synchronization pattern at a predetermined period (at a time coinciding with a normal synchronization pattern).

If it is determined in step S32 that a synchronization pattern has been detected within the detection range, there is no need to interpolate a synchronization pattern, and thus, the process is terminated by skipping the process of step S33.

Returning to FIG. 10, in step S22, the phase error detecting section 51 detects a phase error between equalized amplitude information supplied from the equalizer 34 and the corresponding reproduced clock, and supplies a phase error signal representing the phase error, to the bit slip correcting section 53.

In step S23, the bit slip correcting section 53 detects a difference between the sync signal detected by the synchronization detecting section 52 and the predetermined period as the deviation amount, on the basis of the corresponding reproduced clocks.

In step S24, the bit slip correcting section 53 executes a correction information calculating process.

Figure 12:
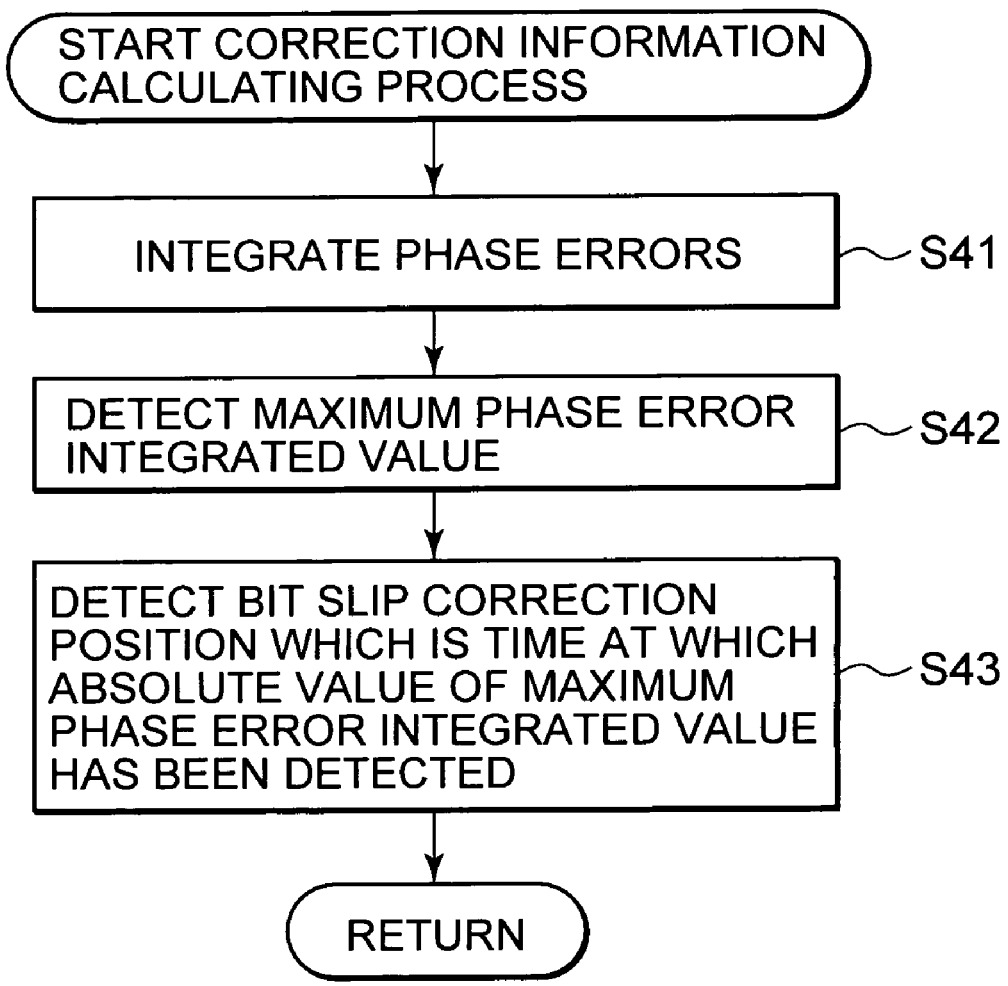
FIG. 12 It is a flowchart for explaining details of a correction information calculating process.

Details of the correction information calculating process in step S24 will be described with reference to the flowchart of FIG. 12.

In step S41, the phase error integrating section 92 integrates phase errors detected in each of predetermined segments, to calculate a phase error segment integrated value.

In step S42, the bit slip judging section 81 detects a maximum for the absolute values of the phase error segment integrated values.

In step S43, the maximum phase error time storing section 93 detects a bit slip correction position which is a time at which the absolute value of the phase error segment integrated value, which is maximum, has been detected, after which the process is terminated.

Returning to FIG. 10 again, in step S25, the bit slip correcting section 53 executes a FIFO control process, after which the bit slip correcting process is terminated.

Figure 13:
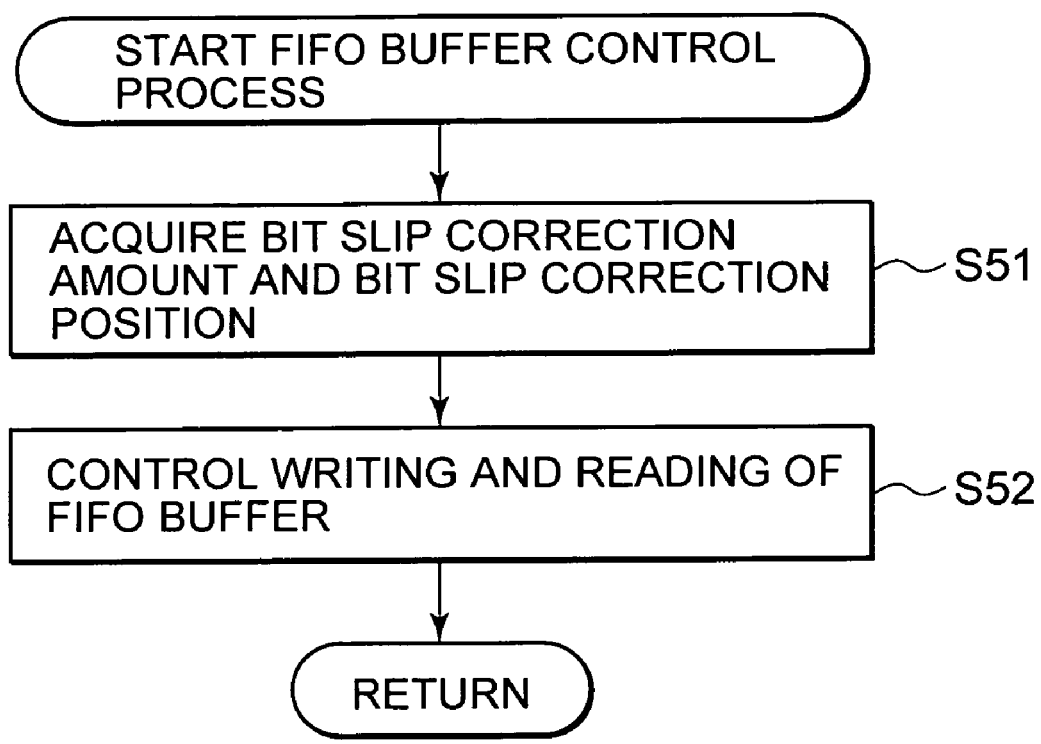
FIG. 13 It is a flowchart for explaining details of a FIFO control process.

Details of the FIFO control process in step S25 will be described with reference to the flowchart of FIG. 13.

In step S51, the FIFO control section 82 acquires the bit slip correction amount representing a deviation amount, and the bit slip correction position representing a deviation occurrence time, from the bit slip judging section 81.

In step S52, in a case where a deviation amount which is other than 0 has been detected, the FIFO control section 82 supplies a control signal for controlling the FIFO buffer 83 to move data of interest in the time direction so as to correspond to the deviation amount, to the FIFO buffer 83, whereby to control writing and reading by the FIFO buffer 83. The FIFO buffer 83 moves the detected data in the time direction so as to correspond to the deviation amount on the basis of the control information supplied from the FIFO control section 82, to make a detected data correction corresponding to the bit slip and then output the corrected detected data, after which the process is terminated.

Referring to FIGS. 14 to 17, detected data correction performed in step S52 by the FIFO buffer 83 will be described.

Figure 14:
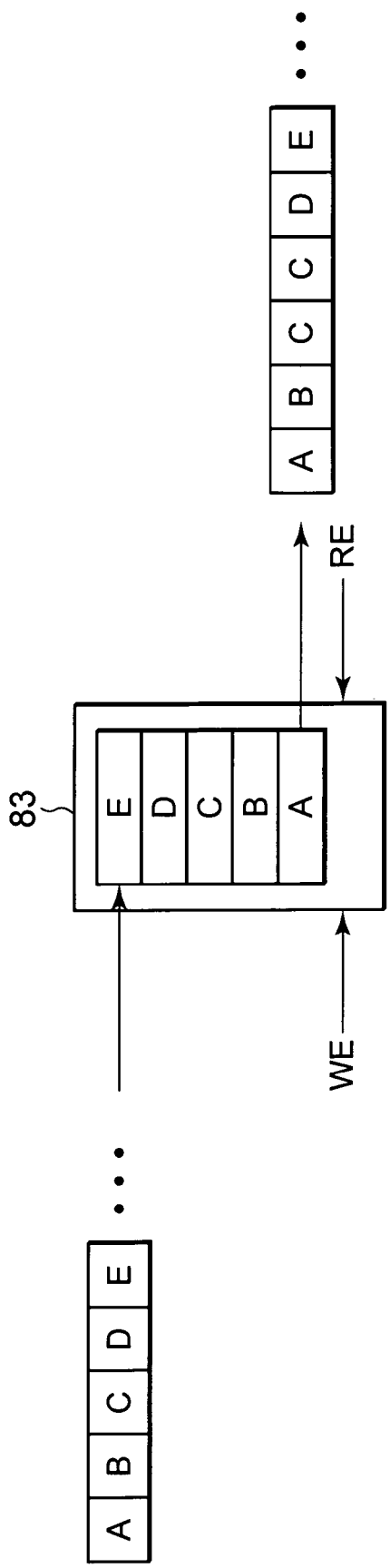
FIG. 14 It is a diagram for explaining detected data correction.

FIG. 14 is a diagram for explaining detected data correction in the FIFO buffer 83 that is controlled to increase the number of detected data bits, in a case where a bit slip correction amount is below 0.

The FIFO buffer 83 is controlled by a RE (Read Enable) signal, and a WE (Write Enable) signal supplied from the FIFO control section 82 on the basis of the bit slip correction information. In a case where the RE signal is "ON" (e.g., 1), the FIFO buffer 83 sequentially outputs detected data it stores in synchronism with reproduced clocks, and in a case where the RE signal is "OFF" (e.g., 0), it repeatedly outputs the same detected data in synchronism with reproduced clocks.

Moreover, in a case where the WE signal is "ON" (e.g., 1), the FIFO buffer 83 sequentially stores detected data supplied from the data detecting section 35 in synchronism with reproduced clocks, and in a case where the WE signal is "OFF" (e.g., 0), it stores detected data supplied from the data detecting section 35 such that a detected data bit stored one reproduced clock ahead is overwritten, in synchronism with a reproduced clock.

In FIGS. 14 to 17, each of rectangles denoted by characters A to E represents one channel bit contained in the corresponding detected data.

As shown on the left side of FIG. 14, an example will be described in which a channel bit which is A, a channel bit which is B, a channel bit which is C, a channel bit which is D and a channel bit which is E are sequentially supplied from the data detecting section 35 to the FIFO buffer 83.

The FIFO buffer 83 sequentially stores the channel bits A to E supplied during a period in which the WE signal is "ON".

The FIFO buffer 83 outputs the channel bits A to E stored in a sequence, in that sequence, in synchronism with reproduced clocks, during a period in which the RE signal is "ON".

In an example shown in FIG. 14, the FIFO buffer 83 keeps the WE signal in the "ON" state at all times for the detected data bits A to E supplied. At a time for reading the data bit C, the FIFO buffer 83 puts the RE signal to "OFF" whereby the FIFO buffer 83 outputs the channel bit A, the channel bit B, the chancel bit C, the channel bit C, the channel bit D and the channel bit E.

Figure 15:
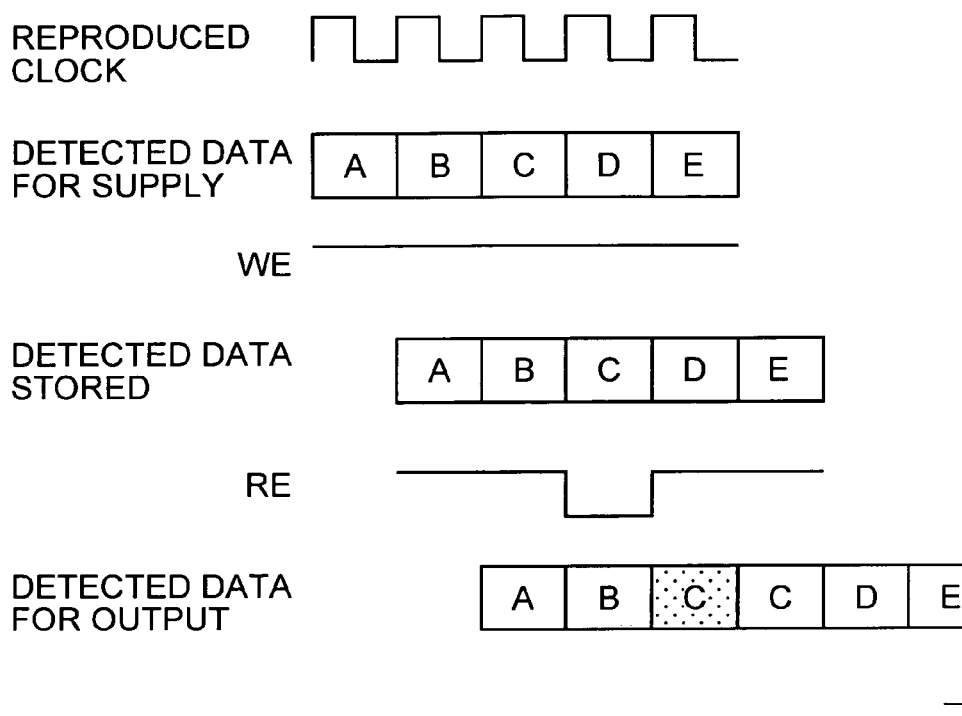
FIG. 15 It is a diagram for explaining detected data correction.

FIG. 15 is a timing chart showing data control in the FIFO buffer 83 to increase detected data.

In an example shown in FIG. 15, "detected data supplied" corresponds to a data arrangement on the left side of FIG. 14. In the example shown in FIG. 15, the detected data, which are the channel bit A, the channel bit B, the channel bit C, the channel bit D and the chancel bit E, are sequentially supplied to the FIFO buffer 83.

The WE signal is a write control signal supplied from the FIFO control section 82 to the FIFO buffer 83. Where the WE signal is "ON", the FIFO buffer 83 advances a WritePointer in synchronism with a reproduced clock to store a channel bit contained in the detected data supplied, and where the WE signal is "OFF", it stores a channel bit contained in the detected data supplied without causing the WritePointer to advance.

In the example shown in FIG. 15, since the WE signal stays "ON" at all times, the FIFO buffer 83 stores the supplied detected data in such a sequence as detected.

"Detected data stored" in the figure is detected data stored in the FIFO buffer 83. The detected data supplied, i.e., the channel bit A, the channel bit B, the channel bit C, the channel bit D and the channel bit E are sequentially stored.

Note that each of the stored detected data in the figure is one reproduced clock behind the corresponding one of the supplied detected data. This means that the process of storing detected data is executed one clock behind.

The RE signal is read control information supplied from the FIFO control section 82 to the FIFO buffer 83. In a case where the RE signal is "ON", the FIFO buffer 83 advances a ReadPointer in synchronism with a reproduced clock, and outputs a channel bit specified by the ReadPointer. In a case where the RE signal is "OFF", it outputs a channel bit specified by the ReadPointer without causing the ReadPointer to advance.

In the example shown in FIG. 15, to read the channel bit A or B, the RE signal is set to "ON", and to read the channel bit C, it is set to "OFF". Furthermore, to read the channel bit D or E, the RE signal is set to "ON".

Therefore, the FIFO buffer 83 does not cause the ReadPointer to advance after having read the channel bit C, and thus it reads the channel bit C twice, whereby to increase the number of detected data bits for output, by 1, compared with the detected data bits supplied.

In the example shown in FIG. 15, detected data, which are the channel bit A, the chancel bit B, the channel bit C, the channel bit C, the channel bit D and the channel bit E, are sequentially outputted.

Note that the detected data outputted deviate one reproduced clock in the time direction from the detected data stored. This means that output of detected data is executed one clock behind.

Figure 16:
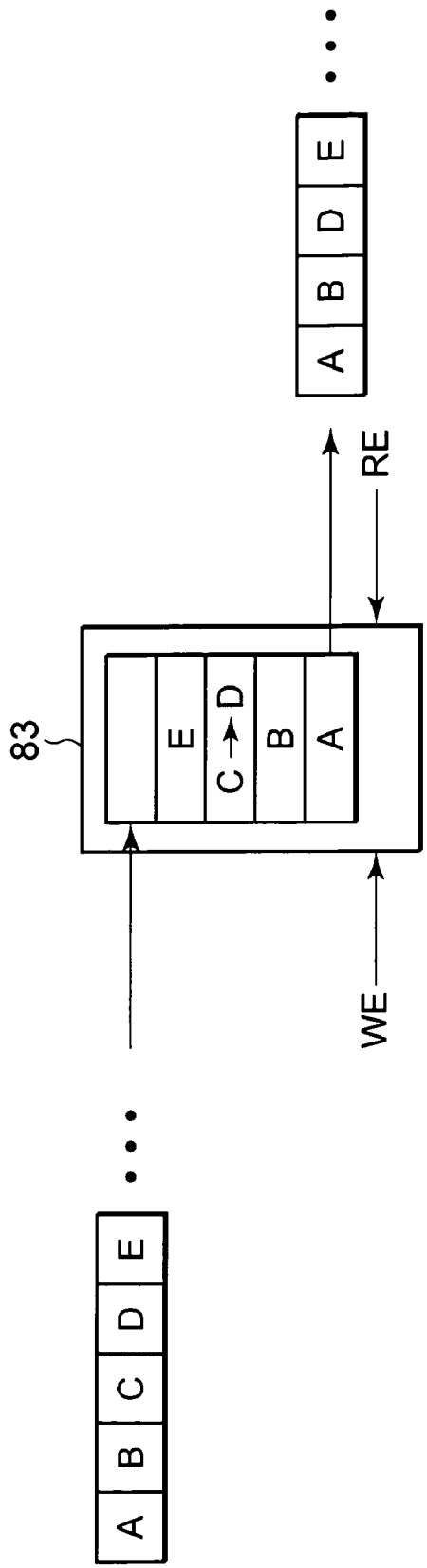
FIG. 16 It is a diagram for explaining detected data correction.

FIG. 16 is a diagram for explaining detected data correction in the FIFO buffer 83 that is controlled to decrease the number of detected data bits, in a case where a bit slip correction amount exceeds 0.

A detected data correcting process in FIG. 16 which is performed by the FIFO buffer 83 is similar to that in the case shown in FIG. 14, and thus its description will be omitted whenever appropriate.

As shown on the left side of FIG. 16, a channel bit A, a channel bit B, a channel bit C, a channel bit D and a channel bit E are supplied to the FIFO buffer 83 sequentially.

In an example shown in FIG. 16, a WE signal is set to "OFF" at a time at which the channel bit C is to be stored. If the RE signal is "OFF", the FIFO buffer 83 overwrites a detected data bit stored one clock ahead with a detected data bit next thereto. Thus, the channel bit C is overwritten with the channel bit D, whereby to store the channel bit A, the channel bit B, the channel bit D and the channel bit E sequentially.

The FIFO buffer 83 outputs the channel bit A, the channel bit B, the channel bit D and the channel bit E in this sequence.

Figure 17:
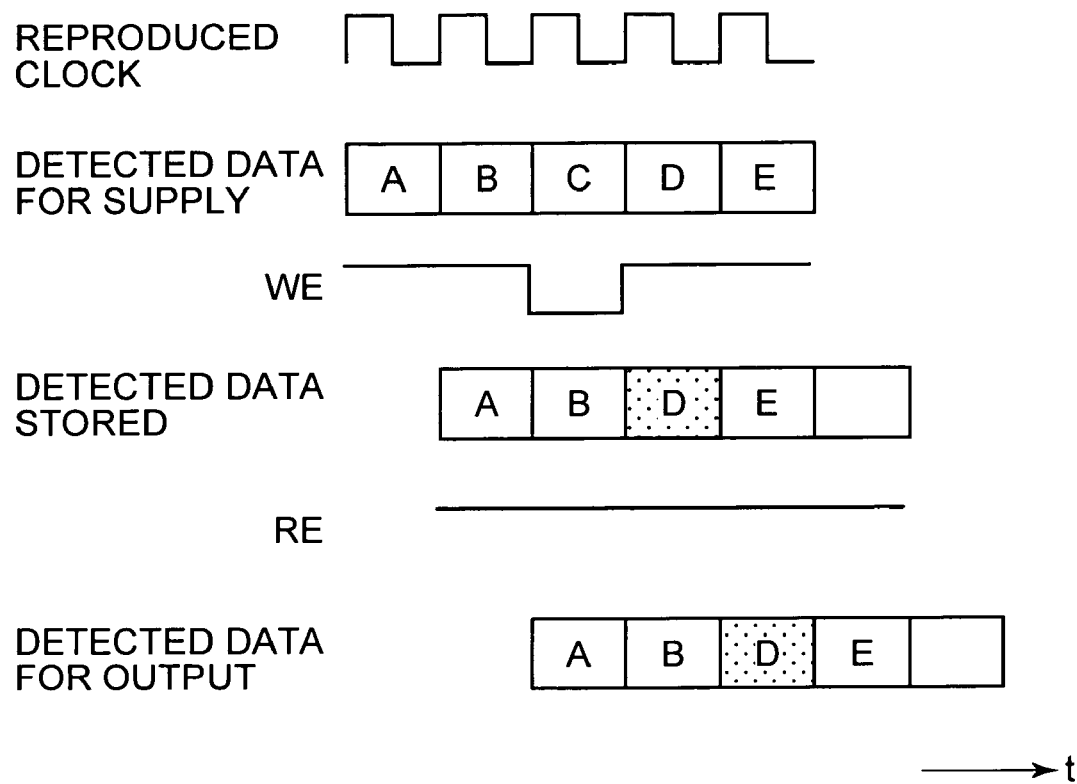
FIG. 17 It is a diagram for explaining detected data correction.

FIG. 17 is a timing chart showing data control by the FIFO buffer 83 to decrease detected data.

"Reproduced clock" to "detection data for output" in FIG. 17 are similar to those in the case shown in FIG. 15, and thus their description will be omitted whenever appropriate.

In an example shown in FIG. 17, the WE signal is set to "ON" in a case where the channel bit A or B is supplied, and to "OFF" in a case where the channel bit C is supplied. Furthermore, the WE signal is set to "ON" in a case where the channel bit D or E is supplied.

Therefore, in this case, the FIFO buffer 83 stops the WritePointer after having written the channel bit C to overwrite the channel bit C with the channel bit D, whereby to decrease the number of detected data bits for storage, by 1.

That is, the FIFO buffer 83 stores the channel bit A, the channel bit B, the channel bit D and the channel bit E sequentially.

In the example shown in FIG. 17, the RE signal stays "ON" at all times, and thus the FIFO buffer 83 outputs the stored detected data sequentially.

The FIFO buffer 83 outputs the channel bit A, the channel bit B, the channel bit D and the channel bit E sequentially.

Note that the FIFO buffer 83 may include, not only a FIFO buffer, but also a general-type memory. For example, in a case where detected data is to be increased in a memory with general addressing, a circuit may be configured such that an address for writing into the memory is incremented by 1 with respect to a reproduced clock at all times, and such that an address for reading from the memory is stopped at any location where operation should be performed or is put back by a necessary amount. Moreover, in a case where detected data is to be decreased, the circuit may be configured such that an address for writing into the memory is stopped at any location where operation should be performed or is put back by a necessary amount, and such that an address for reading from the memory is incremented by 1 with respect to a reproduced clock at all times.

A circuit configuration in a case where a general memory is used is similar to the circuit configuration in a case where a FIFO buffer is used.

Referring next to FIGS. 18 to 27, an embodiment of the present invention will be described, in a case where bit slip correction is to be performed using errors (hereinafter referred to as "zero-crossing offsets") in an amplitude direction of two successive equalized amplitude information bits having different polarities (signs).

Figure 18:
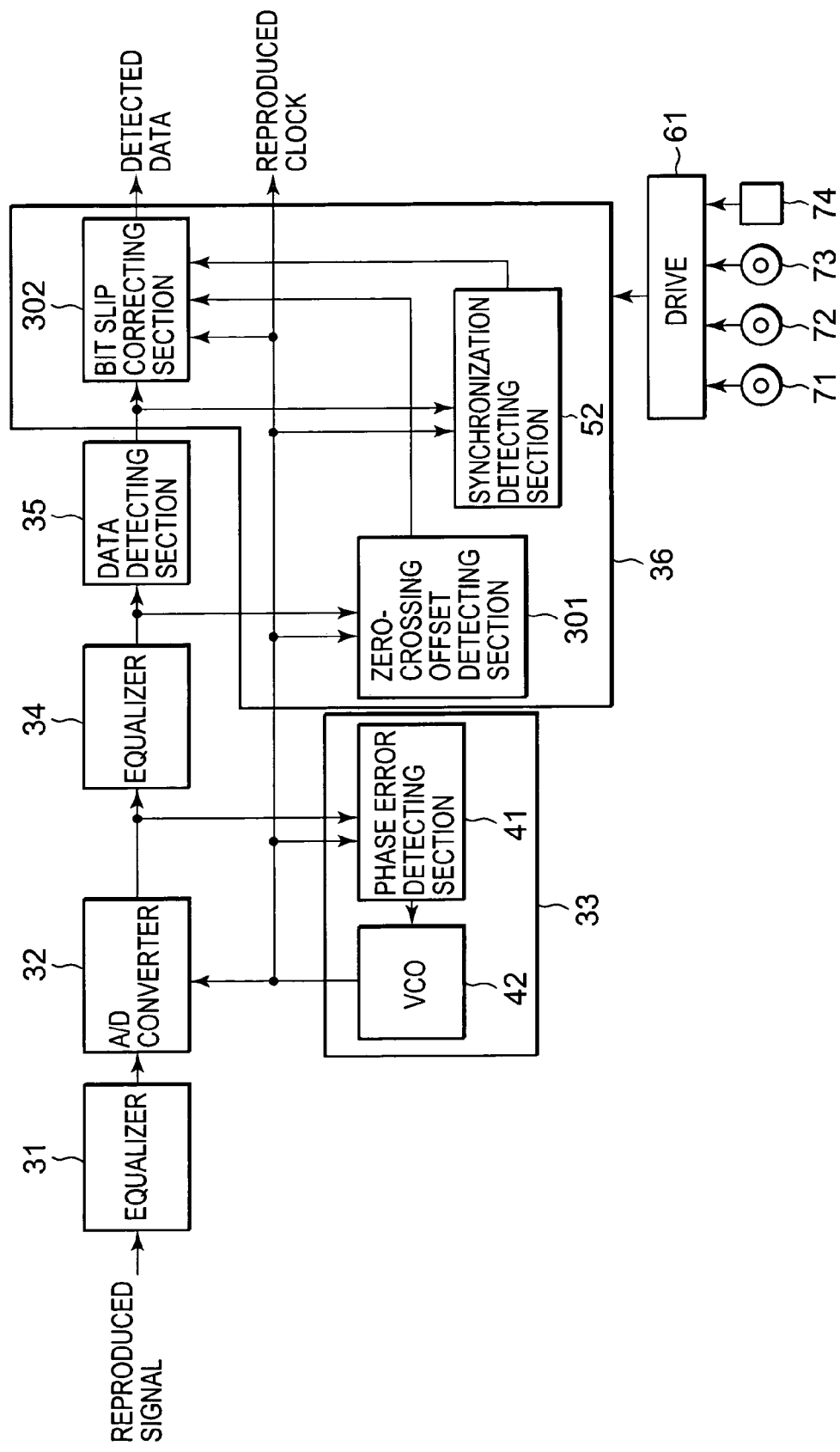
FIG. 18 It is a block diagram showing another configuration of an embodiment of the reproducing apparatus of the present invention.

FIG. 18 is a block diagram showing another configuration of an embodiment of the reproducing apparatus according to the present invention. Portions similar to those in the case shown in FIG. 2 are denoted by the same reference numerals, and their description will be omitted whenever appropriate.

An error correcting section 36 includes a zero-crossing offset detecting section 301, a synchronization detecting section 52 and a bit slip correcting section 302. That is, the error correcting section 36 may include the zero-crossing offset detecting section 301 and the bit slip correcting section 302, instead of the phase error detecting section 51 and the bit slip correcting section 53 described with reference to FIG. 2.

The zero-crossing offset detecting section 301 detects a zero-crossing offset on the basis of equalized amplitude information supplied from an equalizer 34 and a reproduced clock supplied from a clock generating section 33, and supplies a zero-crossing offset signal representing the zero-crossing offset, to the bit slip correcting section 302.

Figure 19:
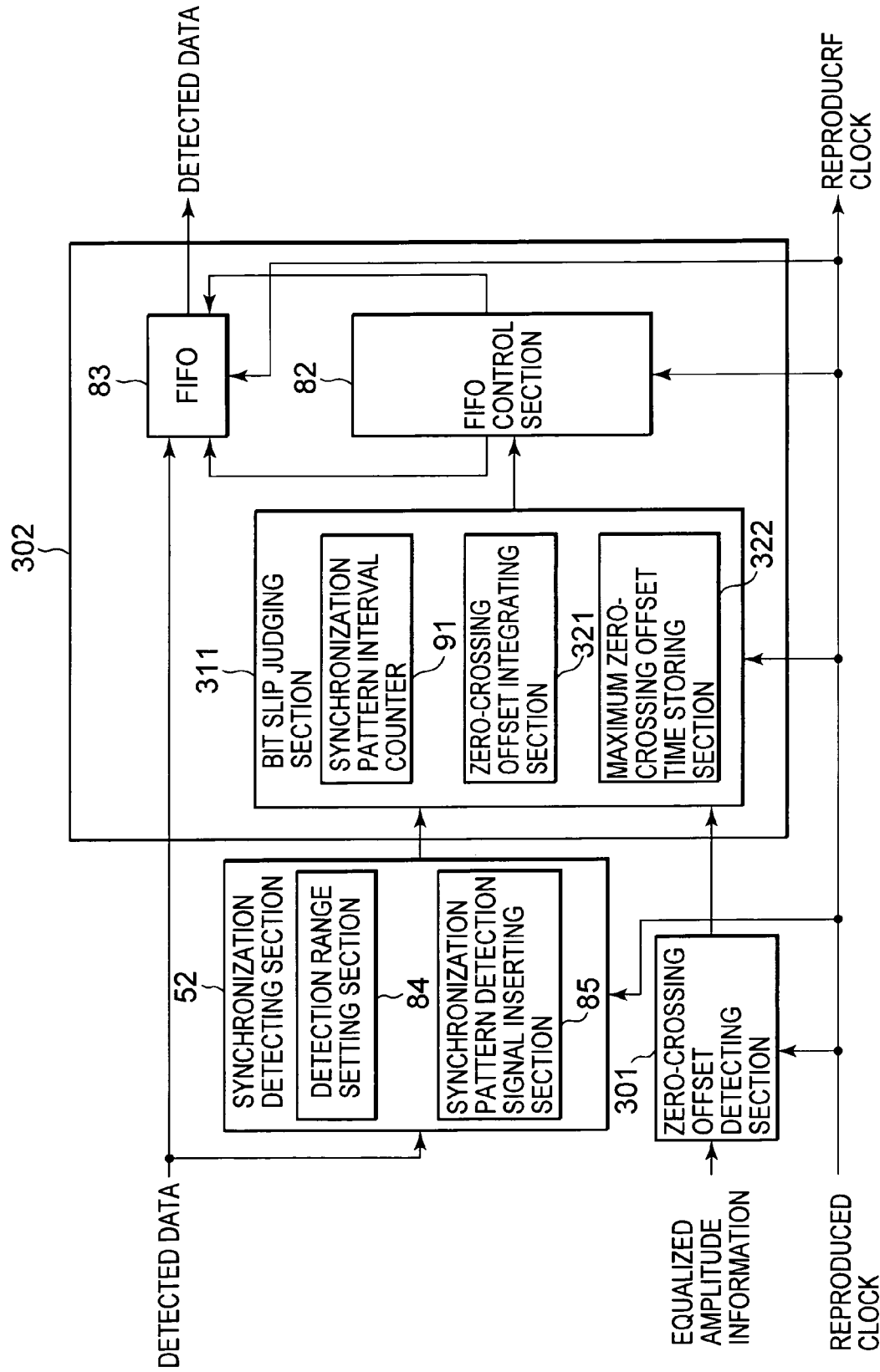
FIG. 19 It is a block diagram showing details of a synchronization detecting section and a bit slip correcting section.

FIG. 19 is a block diagram showing details of the synchronization detecting section and the bit slip correcting section. Portions similar to those in the case shown in FIG. 3 are denoted by the same reference numerals, and their description will be omitted whenever appropriate.

A bit slip judging section 311 includes a synchronization pattern interval counter 91, a zero-crossing offset integrating section 321 and a maximum zero-crossing offset time storing section 322. That is, the bit slip judging section 311 may include the zero-crossing offset integrating section 321 and the maximum zero-crossing offset time storing section 322, instead of the phase error integrating section 92 and the maximum phase error time storing section 93 described with reference to FIG. 3.

The zero-crossing offset integrating section 321 integrates zero-crossing offsets detected in each of segments into which an interval between two successive synchronization patterns is divided, whereby to calculate a zero-crossing offset segment integrated value. Here, a segment into which the interval is divided is determined by any of the predetermined number of zero-crossing offsets, a predetermined period and predetermined channel bits.

The maximum zero-crossing offset time storing section 322 detects a time at which a deviation between a reproduced clock and equalized amplitude information is predicted to have occurred, which is a time defining a segment in which the absolute value of an integrated value obtained by integration becomes maximum between two successive synchronization patterns, and stores that time.

Figure 20:
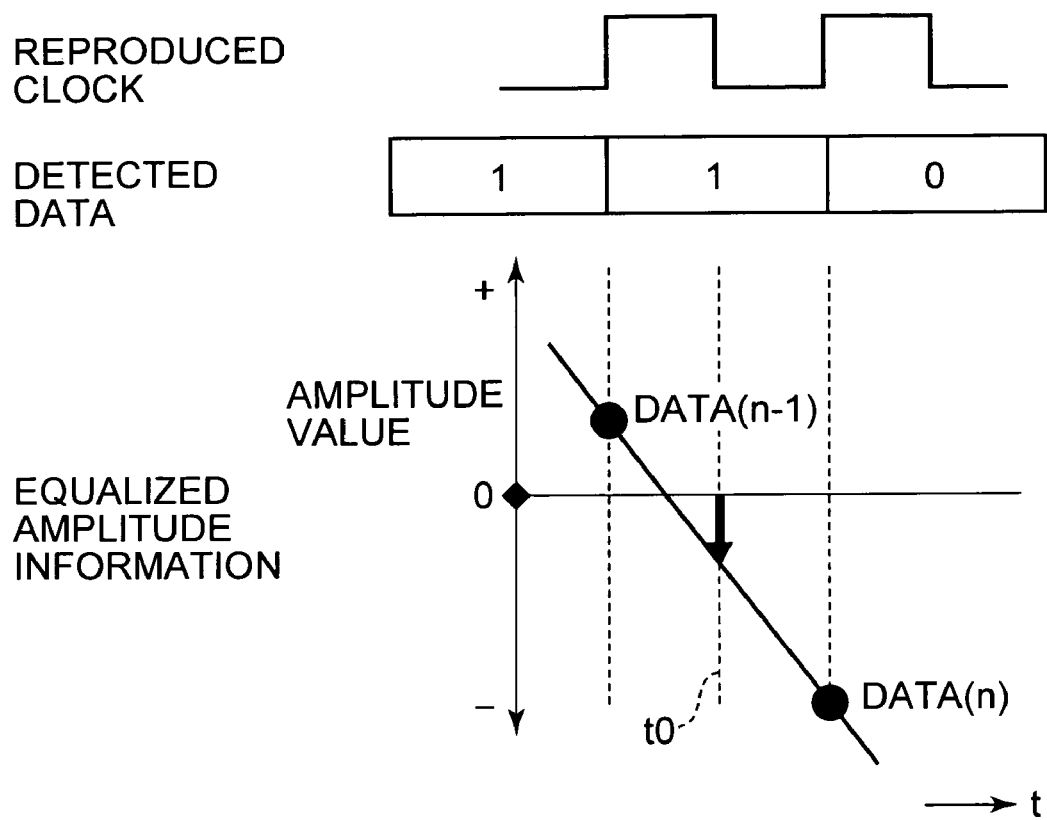
FIG. 20 It is a diagram for explaining zero-crossing offset detection.

Referring next to FIG. 20, an example of zero-crossing offset detection in the zero-crossing offset detecting section 301 will be described.

FIG. 20 is a diagram showing the signal waveform of reproduced clocks, detected data which can take either "1" or "0", and values of equalized amplitude information, with a time axis t extending in the horizontal direction. In FIG. 20, data(n−1) and data(n) are amplitude values of the equalized amplitude information at the rises of reproduced clocks, respectively. The "data (n)" is an amplitude value of the equalized amplitude information next to the "data(n−1)".

A zero-crossing offset is calculated by, e.g., the following equation (3).

$$\text{Zero-crossing offset}=[\text{data}(n)+\text{data}(n-1)]/2 \quad (3)$$

From the equation (3), an offset amount between two successive equalized amplitude information bits having different polarities (signs) is calculated.

Note that in the equation (3), its denominator can be set to an arbitrary integer other than 0. In this case, e.g., 1 may be set, instead of 2.

An offset between two successive equalized amplitude information bits having different polarities (signs) is a zero-crossing offset. The arrow in FIG. 20 represents a zero-crossing offset.

In a case where an error is contained in equalized amplitude information, in a coordinate space having time and amplitude value of equalized amplitude information as its coordinate axes, respectively, a straight line connecting a point specified by the start time of a certain cycle of the reproduced clock and the amplitude value data(n−1) of the equalized amplitude information at that start time, with a point specified by the start time of the next cycle of the reproduced clock and the amplitude value data(n) of the equalized amplitude information at the start time of the next cycle does not pass through a point specified by the half cycle point and an amplitude value which is 0. In a case where an error is contained in the equalized amplitude information, this straight line deviates from the amplitude value which is 0 in the amplitude direction, at the half cycle point (time t0).

The point on this straight line and at the half cycle point (time t0) in the coordinate space having time and amplitude value of equalized amplitude information as its coordinate axes, respectively, will hereinafter be referred to as "zero-crossing offset point".

That is, the zero-crossing offset detecting section 301 detects an error (e.g., the arrow in FIG. 20) between the error reference point and the zero-crossing offset point as a zero-crossing offset.

Here, it is necessary that the polarity of the amplitude value data(n−1) of the equalized amplitude information and the polarity of the amplitude value data(n) of the equalized amplitude information, in a case where a zero-crossing offset has been detected, are different.

Note that the zero-crossing offset detecting section 301 detects a zero-crossing offset signal on the basis of equalized amplitude information and the corresponding reproduced clock. By additionally using detected data outputted from the data detecting section 35, a more accurate zero-crossing offset can be detected. This is because the detected data outputted from the data detecting section 35 have its error corrected, and this allows the zero-crossing offset detecting section 301 to detect the zero-crossing offset between the equalized amplitude information and the corresponding reproduced clock by referring to the time at which the polarities of the error-corrected detected data switch.

Moreover, a method of detecting a phase error in the zero-crossing offset detecting section 301 is not limited to the method described with reference to FIG. 20, but may include other schemes as well. For example, the zero-crossing offset detecting section 301 may classify equalized amplitude information, and detect a zero-crossing offset on the basis of the classified equalized amplitude information.

Figure 21:
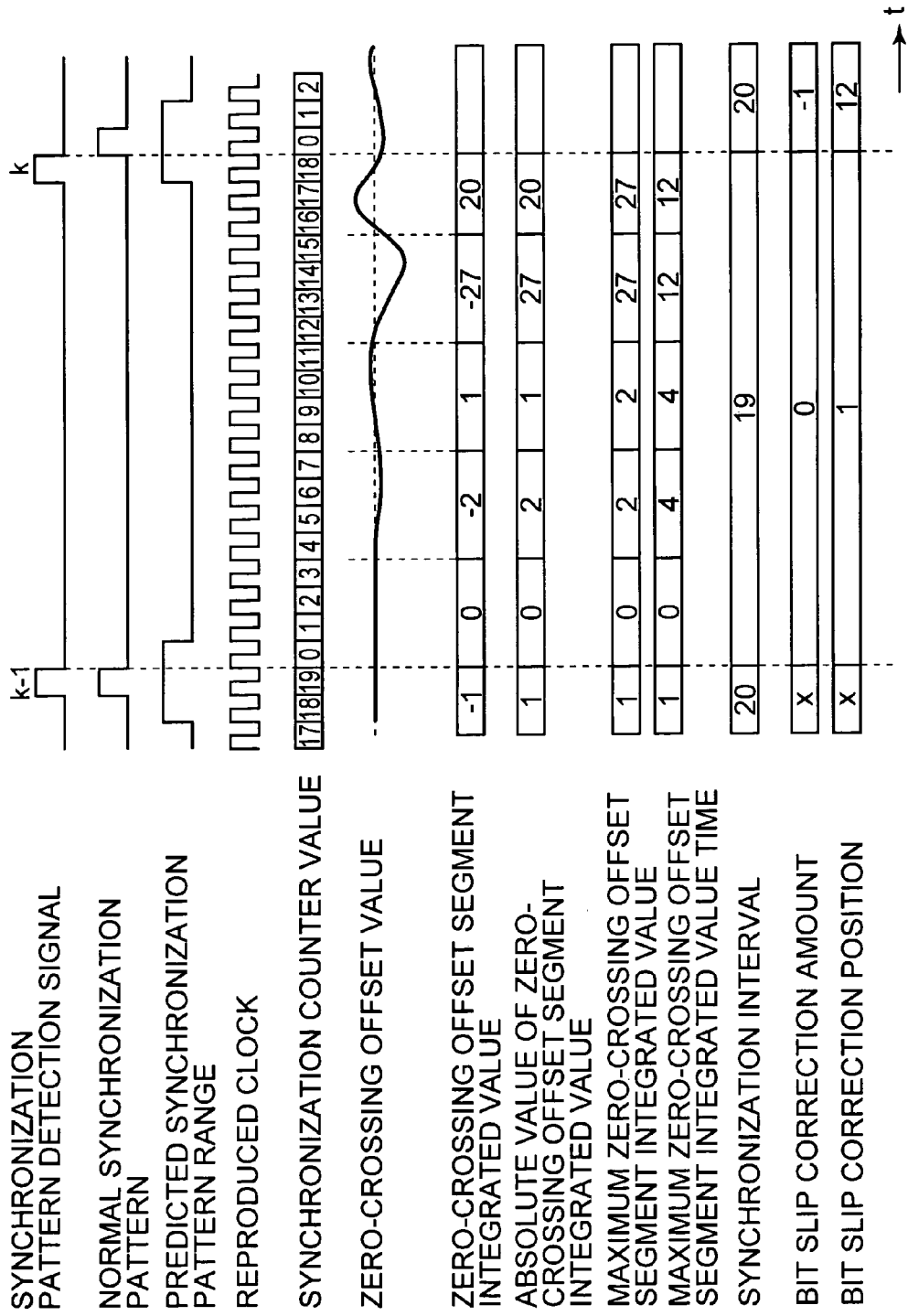
FIG. 21 It is a timing chart showing detection of a deviation amount and a time at which the deviation is predicted to have occurred, with respect to successive synchronization patterns, in a case where a bit slip has occurred.

FIG. 21 is a timing chart showing detection of a deviation amount and detection of a time at which the deviation is predicted to have occurred, with respect to successive synchronization patterns, in a case where a bit slip has occurred.

"Synchronization pattern detection signal" to "synchronization counter value", and "synchronization interval" to "bit slip correction position" in FIG. 21 are similar to those in the case shown in FIG. 5, and thus their description will be omitted whenever appropriate.

"Zero-crossing offset segment integrated value" is an integrated value of zero-crossing offset values in each of segments obtained by dividing a normal synchronization pattern interval by a predetermined number. For example, in a case where one of the segments obtained by dividing the normal synchronization pattern interval by a predetermined number equals four cycles of the reproduced clock, the zero-crossing offset integrating section 321 integrates zero-crossing offset values in each segment corresponding to four cycles of the reproduced clock, whereby to calculate a zero-crossing offset segment integrated value.

In an example shown in FIG. 21, zero-crossing offsets are integrated in each of segments obtained by dividing the normal synchronization pattern interval by 5. After the synchronization pattern detection signal has switched from 0 to 1, a zero-crossing offset segment integrated value which is 0 is calculated in a first segment which is the initial segment, and a zero-crossing offset segment integrated value which is −2 is calculated in a second segment succeeding the first segment. Furthermore, a zero-crossing offset segment integrated value which is 1 is calculated in a third segment succeeding the second segment, and a zero-crossing offset segment integrated value which is −27 is calculated in a fourth segment succeeding the third segment, and further a zero-crossing offset segment integrated value which is 20 is calculated in a fifth segment succeeding the fourth segment.

The absolute values of the zero-crossing offset segment integrated values in the respective segments are calculated by the bit slip judging section 311.

In the example shown in FIG. 21, the absolute value of its zero-crossing offset segment integrated value, which is 0, is calculated in the first segment, and the absolute value of its zero-crossing offset segment integrated value, which is 2, is calculated in the second segment. Furthermore, the absolute value of its zero-crossing offset segment integrated value, which is 1, is calculated in the third segment, the absolute value of its zero-crossing offset segment integrated value, which is 27, is calculated in the fourth segment, and the absolute value of its zero-crossing offset segment integrated value, which is 20, is calculated in the fifth segment.

Furthermore, maximum zero-crossing offset segment integrated values in the respective segments are calculated by the bit slip judging section 311.

In the example shown in FIG. 21, in the first segment, the initial value 0 is compared with the absolute value of its zero-crossing offset segment integrated value, which is 0, to calculate a maximum zero-crossing offset segment integrated value resulting in 0. In the second segment, the maximum zero-crossing offset segment integrated value in the first segment, which is 0, is compared with the absolute value of the zero-crossing offset segment integrated value in the second segment, which is 2, to calculate a maximum zero-crossing offset segment integrated value resulting in 2. Furthermore, in the third segment, the maximum zero-crossing offset segment integrated value in the second segment, which is 2, is compared with the absolute value of the zero-crossing offset segment integrated value in the third segment, which is 1, to calculate the maximum zero-crossing offset segment integrated value resulting in 2, and in the fourth segment, the maximum zero-crossing offset segment integrated value in the third segment, which is 2, is compared with the absolute value of the zero-crossing offset segment integrated value in the fourth segment, which is 27, to calculate a maximum zero-crossing offset segment integrated value resulting in 27. Moreover, in the fifth segment, the maximum zero-crossing offset segment integrated value in the fourth segment, which is 27, is compared with the absolute value of the zero-crossing offset segment integrated value in the fifth segment, which is 20, to calculate the maximum zero-crossing offset segment integrated value resulting in 27.

"Maximum zero-crossing offset segment integrated value time" is the heading synchronization counter value in a segment in which the absolute value of a zero-crossing offset segment integrated value is selected as a maximum zero-crossing offset segment integrated value. For example, in a case where each of segments obtained by dividing a normal synchronization pattern interval by a predetermined number equals four cycles of the reproduced clock, the maximum zero-crossing offset time storing section 322 stores the heading synchronization counter value in a segment having the maximum zero-crossing offset segment integrated value, as to the segments each corresponding to four cycles of the reproduced clock.

Note that the maximum zero-crossing offset segment integrated value time is not limited to the heading synchronization counter value in a segment in which the absolute value of a zero-crossing offset segment integrated value is selected as a maximum zero-crossing offset segment integrated value, but may also include the last synchronization counter value in the segment selected as having the maximum zero-crossing offset segment integrated value, the intermediate synchronization counter value in the segment selected as having the maximum zero-crossing offset segment integrated value, or an arbitrary synchronization counter value in the segment selected as having the maximum zero-crossing offset segment integrated value.

In the example shown in FIG. 21, in the first segment, the heading synchronization counter value in the first segment having a maximum zero-crossing offset segment integrated value is acquired, to store a maximum zero-crossing offset segment integrated value time which is 0 in the maximum zero-crossing offset time storing section 322. In the second segment, the absolute value of its zero-crossing offset segment integrated value is selected as a maximum zero-crossing offset segment integrated value, and thus the heading synchronization counter value in the second segment is acquired, to store a maximum zero-crossing offset segment integrated value time which is 4 in the maximum zero-crossing offset time storing section 322.

Furthermore, in the third segment, the absolute value of its zero-crossing offset segment integrated value is not selected as a maximum zero-crossing offset segment integrated value, and thus the maximum zero-crossing offset segment integrated value time stored in the maximum zero-crossing offset time storing section 322 remains unchanged. In the fourth segment, the absolute value of its zero-crossing offset segment integrated value is selected as a maximum zero-crossing offset segment integrated value, and thus the heading synchronization counter value in the fourth segment is acquired, to store a maximum zero-crossing offset segment integrated value time which is 12 in the maximum zero-crossing offset time storing section 322. And in the fifth segment, the absolute value of its zero-crossing offset segment integrated value is not selected as a maximum zero-crossing offset segment integrated value, and thus the maximum zero-crossing offset segment integrated value time stored in the maximum zero-crossing offset time storing section 322 remains unchanged.

In the example shown in FIG. 21, bit slip correction amounts are calculated as follows. A bit slip correction amount which is 0 is calculated in a synchronization pattern interval (k−1, k), i.e., at a time k−1, and a normal synchronization interval which is 20 is subtracted from a synchronization interval which is 19 in a synchronization pattern interval (k, k+1), whereby to calculate a bit slip correction amount resulting in −1 at a time k.

"Bit slip correction position" is a maximum zero-crossing offset segment integrated value time stored in the maximum zero-crossing offset time storing section 322 upon rise of a synchronization pattern detection signal.

That is, the bit slip correction position represents a time for a segment in which a deviation of detected data (equalized amplitude information) is assumed to have occurred with respect to the corresponding reproduced clock.

In the example shown in FIG. 21, bit slip correction positions are calculated as follows. A bit slip correction position which is 1 is calculated at the time k−1, and a bit slip correction position resulting in 12 is calculated at the time k.

In the example shown in FIG. 21, the bit slip correction-amount which is −1 and the bit slip correction position which is 12 are supplied to a FIFO control section 82 as the bit slip correction information, in the synchronization pattern interval (k, k+1). Moreover, the bit slip judging section 311 judges that a bit slip has occurred since the bit slip correction amount, i.e., the deviation amount is other than 0.

Note that in the synchronization pattern interval (k−1, k), the bit slip correction amount equals 0, and the bit slip correction position equals 1. In this case, however, no bit slip correction is made, since the bit slip correction amount is 0, although the bit slip correction position takes a certain value.

FIG. 22 is a diagram showing a method of calculating a bit slip occurrence position (a time for a segment in which a deviation of detected data (equalized amplitude information) is assumed to have occurred with respect to the corresponding reproduced clock) in a case where a bit slip has occurred.

In FIG. 22, a mutual relationship is shown among "zero-crossing offset segment integrated value", "detected data", "absolute value of zero-crossing offset segment integrated value", "detected data after correction" and "detected data range for correction" in segments N−1, N and N+1 each defined by synchronization pattern detection signals. Moreover, in an example shown in FIG. 22, a bit slip has occurred at a time A.

"Detected data", and "detected data after correction" and "detected data range for correction" in FIG. 22 are similar to those in the case shown in FIG. 6, and thus their description will be omitted whenever appropriate.

A waveform 411 represents integrated values of zero-crossing offsets, calculated by the zero-crossing offset integrating section 321. Rectangles shown in a manner overlapping with the waveform 411 respectively represent integrated values of zero-crossing offsets in respective segments.

Since the absolute value of a zero-crossing offset segment integrated value is an absolute value as to a zero-crossing offset segment integrated value, a zero-crossing offset segment integrated value which is a negative value becomes a positive value with its sign inverted. Furthermore, through a comparison among the absolute values of zero-crossing offset segment integrated values, the absolute value of a zero-crossing offset segment integrated value in a segment denoted by B becomes the maximum zero-crossing offset segment integrated value, and thus (a time for) the segment denoted by B becomes the bit slip correction position.

The detected data is corrected into as many detected data bits as those to be arranged between two normal synchronization patterns in a case where no bit slip occurs. In the example shown in FIG. 22, the "detected data after correction" is corrected so as to have L channel bits.

As a result of this correction, the detected data from the time for the segment denoted by B to the end of the segment N are corrected. In a segment 412 with large zero-crossing offsets, the reproduced signals themselves have changed, and thus, even if a correction is made in the time direction, normal detected data cannot be obtained. In a segment 413 with small zero-crossing offsets, the reproduced signals themselves have recovered, and thus normal detected data can be obtained by a correction in the time direction.

Thus, in a case where a burst error has occurred and a bit slip has occurred due to the burst error, the reproducing apparatus of the present invention can correct an error preceding a synchronization pattern which is detected after the bit slip.

Figure 23:
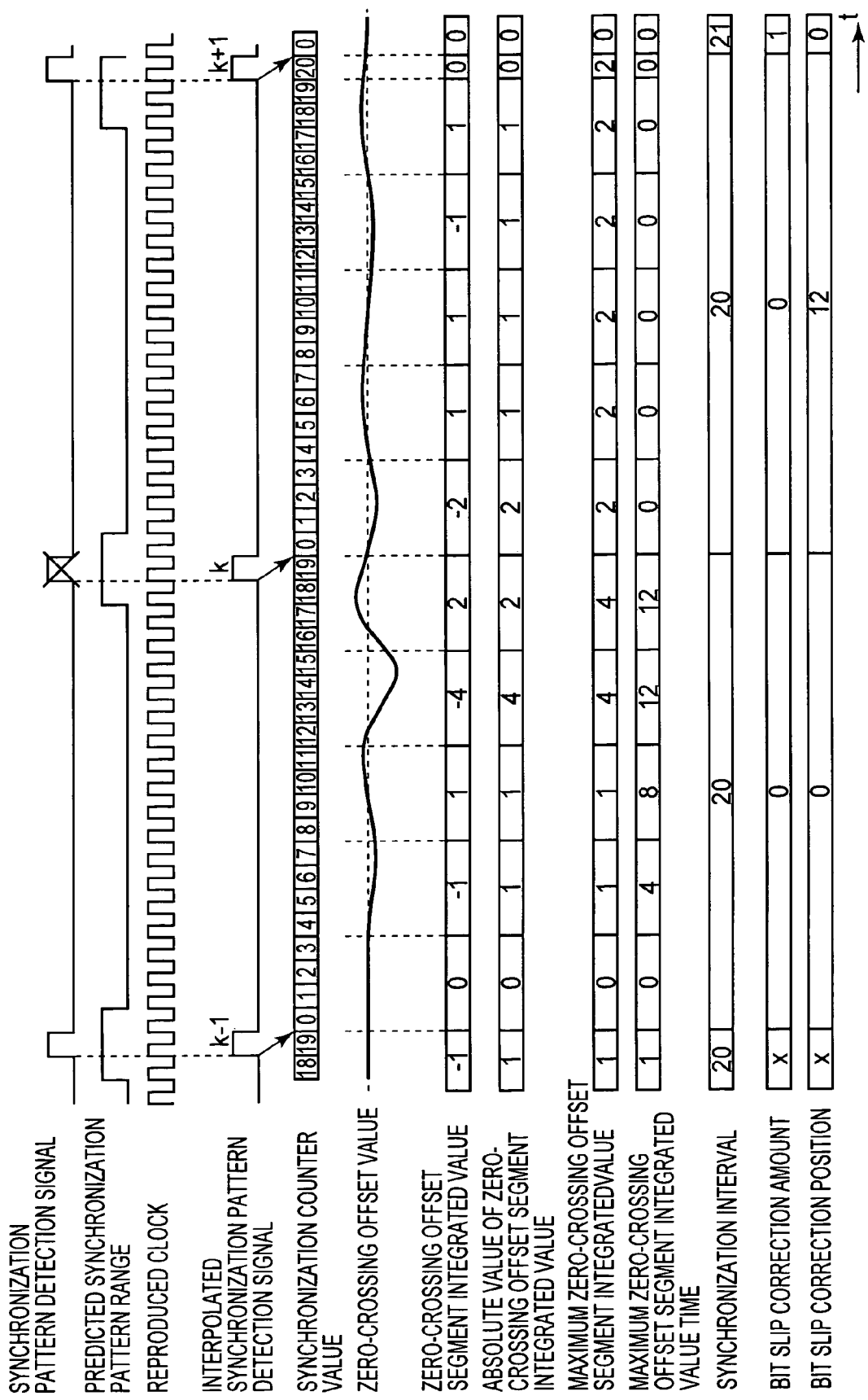
FIG. 23 It is a timing chart for explaining insertion of a synchronization pattern detection signal, in a case where no synchronization pattern has been detected in a synchronization pattern interpolation mode.

FIG. 23 is a timing chart for explaining insertion of a synchronization pattern detection signal in a case where no synchronization pattern has been detected in the synchronization pattern interpolation mode.

"Synchronization pattern detection signal" to "reproduced clock", and "synchronization counter value" to "bit slip correction position" in FIG. 23 are similar to those shown in FIG. 21, and thus their description will be omitted whenever appropriate.

In an example shown in FIG. 23, zero-crossing offset segment integrated values are obtained as follows. In segments obtained by dividing a "synchronization pattern interval after interpolation" (k−1, k) by 5, zero-crossing offsets are integrated, and in segments obtained by dividing a "synchronization pattern interval after interpolation" (k, k+1) by 6, zero-crossing offsets are integrated.

In a "synchronization pattern interval after interpolation" (k−1, k), after a "synchronization pattern detection signal after interpolation" has switched from 0 to 1, in a first segment which is the initial segment, a zero-crossing offset segment integrated value which is 0 is calculated, and in a second segment succeeding the first segment, a zero-crossing offset segment integrated value which is −1 is calculated. Furthermore, a zero-crossing offset segment integrated value which is 1 is calculated in a third segment succeeding the second segment, a zero-crossing offset segment integrated value which is −4 is calculated in a fourth segment succeeding the third segment, and a zero-crossing offset segment integrated value which is 2 is calculated in a fifth segment succeeding the fourth segment.

Furthermore, after the "synchronization pattern detection signal after interpolation" has switched from 0 to 1 in a "synchronization pattern interval after interpolation" (k, k+1), a zero-crossing offset segment integrated value which is −2 is calculated in a first segment which is the initial segment, and a zero-crossing offset segment integrated value which is 1 is calculated in a second segment succeeding the first segment. Furthermore, a zero-crossing offset segment integrated value which is 1 is calculated in a third segment succeeding the second segment, a zero-crossing offset segment integrated value which is −1 is calculated in a fourth segment succeeding the third segment, and a zero-crossing offset segment integrated value which is 1 is calculated in a fifth segment succeeding the fourth segment. Moreover, due to a bit slip having occurred, in a sixth segment succeeding the fifth segment, a zero-crossing offset integrated value which is 0 is calculated.

As the absolute values of the zero-crossing offset segment integrated values, in the synchronization pattern interval (k−1, k) in the example shown in FIG. 23, the absolute value of its zero-crossing offset segment integrated value, which is 0, is calculated in the first segment, and the absolute value of its zero-crossing offset segment integrated value, which is 1, is calculated in the second segment. Furthermore, the absolute value of its zero-crossing offset segment integrated value, which is 1, is calculated in the third segment, the absolute value of its zero-crossing offset segment integrated value, which is 4, is calculated in the fourth segment, and the absolute value of its zero-crossing offset segment integrated value, which is 2, is calculated in the fifth segment.

Furthermore, in the synchronization pattern interval (k, k+1), the absolute value of its zero-crossing offset segment integrated value, which is 2, is calculated in the first segment, the absolute value of its zero-crossing offset segment integrated value, which is 1, is calculated in the second segment, the absolute value of its zero-crossing offset segment integrated value, which is 1, is calculated in the third segment, the absolute value of its zero-crossing offset segment integrated value, which is 1, is calculated in the fourth segment, the absolute value of its zero-crossing offset segment integrated value, which is 1, is calculated in the fifth segment, and the absolute value of its zero-crossing offset segment integrated value, which is 0, is calculated in the sixth segment.

As maximum zero-crossing offset segment integrated values, in the synchronization pattern interval (k−1, k) in the example shown in FIG. 23, the initial value 0 is compared with the absolute value of its zero-crossing offset segment integrated value, which is 0, to calculate a maximum zero-crossing offset segment integrated value resulting in 0, in the first segment. In the second segment, the maximum zero-crossing offset segment integrated value in the first segment, which is 0, is compared with the absolute value of the zero-crossing offset segment integrated value in the second segment, which is 1, to calculate a maximum zero-crossing offset segment integrated value resulting in 1. Furthermore, in the third segment, the maximum zero-crossing offset segment integrated value in the second segment, which is 1, is compared with the absolute value of the zero-crossing offset segment integrated value in the third segment, which is 1, to calculate the maximum zero-crossing offset segment integrated value resulting in 1, and in the fourth segment, the maximum zero-crossing offset segment integrated value in the third segment, which is 1, is compared with the absolute value of the zero-crossing offset segment integrated value in the fourth segment, which is 4, to calculate a maximum zero-crossing offset segment integrated value resulting in 4. Moreover, in the fifth segment, the maximum zero-crossing offset segment integrated value in the fourth segment, which is 4, is compared with the absolute value of the zero-crossing offset segment integrated value in the fifth segment, which is 2, to calculate the maximum zero-crossing offset segment integrated value resulting in 4.

Furthermore, in the synchronization pattern interval (k, k+1), in the first segment, the initial value 0 is compared with the absolute value of its zero-crossing offset segment integrated value, which is 2, to calculate a maximum zero-crossing offset segment integrated value resulting in 2. In the second segment, the maximum zero-crossing offset segment integrated value in the first segment, which is 2, is compared with the absolute value of the zero-crossing offset segment integrated value in the second segment, which is 1, to calculate the maximum zero-crossing offset segment integrated value resulting in 2. Furthermore, in the third segment, the maximum zero-crossing offset segment integrated value in the second segment, which is 2, is compared with the absolute value of the zero-crossing offset segment integrated value in the third segment, which is 1, to calculate the maximum zero-crossing offset segment integrated value resulting in 2, and in the fourth segment, the maximum zero-crossing offset segment integrated value in the third segment, which is 2, is compared with the absolute value of the zero-crossing offset segment integrated value in the fourth segment, which is 1, to calculate the maximum zero-crossing offset segment integrated value resulting in 2.

Moreover, in the fifth segment, the maximum zero-crossing offset segment integrated value in the fourth segment, which is 2, is compared with the absolute value of the zero-crossing offset segment integrated value in the fifth segment, which is 1, to calculate the maximum zero-crossing offset segment integrated value resulting in 2, and in the sixth segment, the maximum zero-crossing offset segment integrated value in the fifth segment, which is 2, is compared with the absolute value of the zero-crossing offset segment integrated value in the sixth segment, which is 0, to calculate the maximum zero-crossing offset segment integrated value resulting in 2.

In the synchronization pattern interval (k−1, k) in the example shown in FIG. 23, as maximum zero-crossing offset segment integrated value times, in the example shown in FIG. 23, in the first segment, the heading synchronization counter value in the first segment having a maximum zero-crossing offset segment integrated value is acquired, to store a maximum zero-crossing offset segment integrated value time which is 0 in the maximum zero-crossing offset time storing section 322. In the second segment, the absolute value of a zero-crossing offset segment integrated value error is selected as a maximum zero-crossing offset segment integrated value, and thus the heading synchronization counter value in the second segment is acquired, to store a maximum zero-crossing offset segment integrated value time which is 4 in the maximum zero-crossing offset time storing section.

Furthermore, in the third segment, the absolute value of a zero-crossing offset segment integrated value error is selected as a maximum zero-crossing offset segment integrated value, and thus the heading synchronization counter value in the third segment having the maximum zero-crossing offset segment integrated value is acquired, to store a maximum zero-crossing offset segment integrated value time which is 8 in the maximum zero-crossing offset time storing section. In the fourth segment, the absolute value of a zero-crossing offset segment integrated value error is selected as a maximum zero-crossing offset segment integrated value, and thus the heading synchronization counter value in the fourth segment having the maximum zero-crossing offset segment integrated value is acquired, to store a maximum zero-crossing offset segment integrated value time which is 12 in the maximum zero-crossing offset time storing section. And in the fifth segment, the absolute value of a zero-crossing offset segment integrated value error is not selected as a maximum zero-crossing offset segment integrated value, and thus the maximum zero-crossing offset segment integrated value time stored in the maximum zero-crossing offset time storing section 322 remains unchanged.

Furthermore, in the synchronization pattern interval (k, k+1) in the example shown in FIG. 23, as maximum zero-crossing offset segment integrated value times, in the first segment, the heading synchronization counter value in the first segment having a maximum zero-crossing offset segment integrated value is acquired, to store a maximum zero-crossing offset segment integrated value time which is 0 in the maximum zero-crossing offset time storing section 322. In the second segment, the absolute value of a zero-crossing offset segment integrated value error is not selected as a maximum zero-crossing offset segment integrated value, and thus the maximum zero-crossing offset segment integrated value time stored in the maximum zero-crossing offset time storing section 322 remains unchanged. In the third segment, the absolute value of a zero-crossing offset segment integrated value error is not selected as a maximum zero-crossing offset segment integrated value, and thus the maximum zero-crossing offset segment integrated value time stored in the maximum zero-crossing offset time storing section 322 remains unchanged.

In the fourth segment, the absolute value of a zero-crossing offset segment integrated value error is not selected as a maximum zero-crossing offset segment integrated value, and thus the maximum zero-crossing offset segment integrated value time stored in the maximum zero-crossing offset time storing section 322 remains unchanged. In the fifth segment, the absolute value of a zero-crossing offset segment integrated value error is not selected as a maximum zero-crossing offset segment integrated value, and thus the maximum zero-crossing offset segment integrated value time stored in the maximum zero-crossing offset time storing section 322 remains unchanged. And in the sixth segment, the absolute value of a zero-crossing offset segment integrated value error is not selected as a maximum zero-crossing offset segment integrated value, and thus the maximum zero-crossing offset segment integrated value time stored in the maximum zero-crossing offset time storing section 322 remains unchanged.

Note that in a case where maximum zero-crossing offset segment integrated values are equal in successive segments, which one of the former and latter maximum zero-crossing offset segment integrated values should prevail is determined by setting. In the example shown in FIG. 23, the maximum zero-crossing offset segment integrated values in the second and third segments are 1, and the maximum zero-crossing offset segment integrated value time in the third segment is 8. Here, if the maximum zero-crossing offset segment integrated values are equal, it is set such that the latter maximum zero-crossing offset segment integrated value should prevail, and thus the value in the third segment prevails over that in the second segment.

In the example shown in FIG. 23, bit slip correction amounts are calculated as follows. In the "synchronization pattern interval after correction" (k−1, k), i.e., at the time k−1, a bit slip correction amount which is 0 is calculated, and in the "synchronization pattern interval after correction" (k, k+1), i.e., at the time k, a bit slip correction amount which is 0 is calculated. Moreover, in a "synchronization pattern interval after correction" (k+1, k+2), i.e., at a time k+1, a bit slip correction amount which is 1 is calculated.

Here, for example, at the time k, the synchronization pattern detection signal inserting section 85 inserts the synchronization pattern detection signal at the predetermined time, and thus 0 is calculated as the bit slip correction amount at the time k.

In the example shown in FIG. 23, bit slip correction positions are calculated as follows. At the time k−1, a bit slip correction position which is 0 is calculated, and at the time k, a bit slip correction position which is 12 is calculated. And further, at the time k+1, a bit slip correction position which is 0 is calculated.

In a case where the synchronization pattern detection signal inserting section 85 has inserted a synchronization pattern detection signal at a predetermined time, a bit slip correction is made at a time at which a first synchronization pattern detection signal is detected after the synchronization pattern detection signal has been inserted. In the example shown in FIG. 23, at the time k+1, which is after the time k at which the synchronization pattern detection signal has been inserted, a bit slip correction is made. And the bit slip correction amount which is 1 and the bit slip correction position which is 12 are supplied to the FIFO control section 82 as the bit slip correction information. In this case, the bit slip judging section 311 judges that a bit slip has occurred because the bit slip correction amount, i.e., the deviation amount is other than 0.

Note that at the time k, the bit slip correction amount equals 0, and the bit slip correction position equals 12. In this case, however, no bit slip correction is made, since the bit slip correction amount is 0, although the bit slip correction position takes a certain value.

FIG. 24 is a diagram showing a method of calculating a bit slip occurrence position in a case where a bit slip has occurred and no synchronization pattern has been detected.

In FIG. 24, a mutual relationship is shown among "zero-crossing offset segment integrated value", "detected data", "absolute value of zero-crossing offset segment integrated value", "detected data after correction" and "detected data range for correction" in segments N−1, N and N+1 each defined by synchronization pattern detection signals.

"Zero-crossing offset segment integrated value" to "detected data range for correction" in FIG. 24 are similar to those in the case shown in FIG. 22, and thus their description will be omitted whenever appropriate.

Similarly to the case shown in FIG. 22, rectangles shown in a manner overlapping with a waveform 411 respectively represents zero-crossing offset segment integrated values. That is, in an example shown in FIG. 24, a synchronization pattern detection signal is inserted at a time at which the segment N switches to the segment N+1, and the rectangles shown so as to overlap with the waveform 411 respectively represent zero-crossing offset integrated values in segments, in the segment N+1 after the synchronization pattern detection signal has been inserted.

As to "detected data", in the example shown in FIG. 24, L channel bit detected data is arranged in the segment N−1 in which no bit slip has occurred. Moreover, in the segments N and N+1, a bit slip has occurred, and thus no synchronization pattern has been detected. Consequently, through the segments N and N+1, detected data of (L+L+1) channel bit is arranged.

In the example shown in FIG. 24, in the segment N+1 after the synchronization pattern detection signal has been inserted, the absolute value of a zero-crossing offset segment integrated value in a segment denoted by C becomes maximum, and thus (a time for) the segment denoted by C is the bit slip correction position.

As to "detected data after interpolation", in the example shown in FIG. 24, in the segment N in which no bit slip is deemed to have occurred, bit detected data of L channel is arranged. In other words, since the synchronization pattern detection signal is inserted, detected data of L channel bit is arranged in the segment N, and the detected data of remaining (L+1) channel bit is arranged in the segment N+1.

Then, in the segment N+1, the detected data of (L+1) channel bit is changed to data of L channel bit by correction.

That is, bit slip correction is executed such that the detected data in the segment N+1 equals L channel bits.

As to "detection data range for correction", the reproduced signals themselves have changed in the segment 421, and thus, even if they are corrected in the time direction, normal detected data cannot be obtained. Since the reproduced signal themselves have recovered in the segment 422, normal detected data can be detected by making a correction in the time direction.

Thus, in a case where no synchronization pattern has been detected, the invention apparatus of the present invention inserts a synchronization pattern detection signal at a predetermined time, to supplement a synchronization pattern, whereby it can correct an error preceding the synchronization pattern which is detected after a bit slip.

Figure 26:
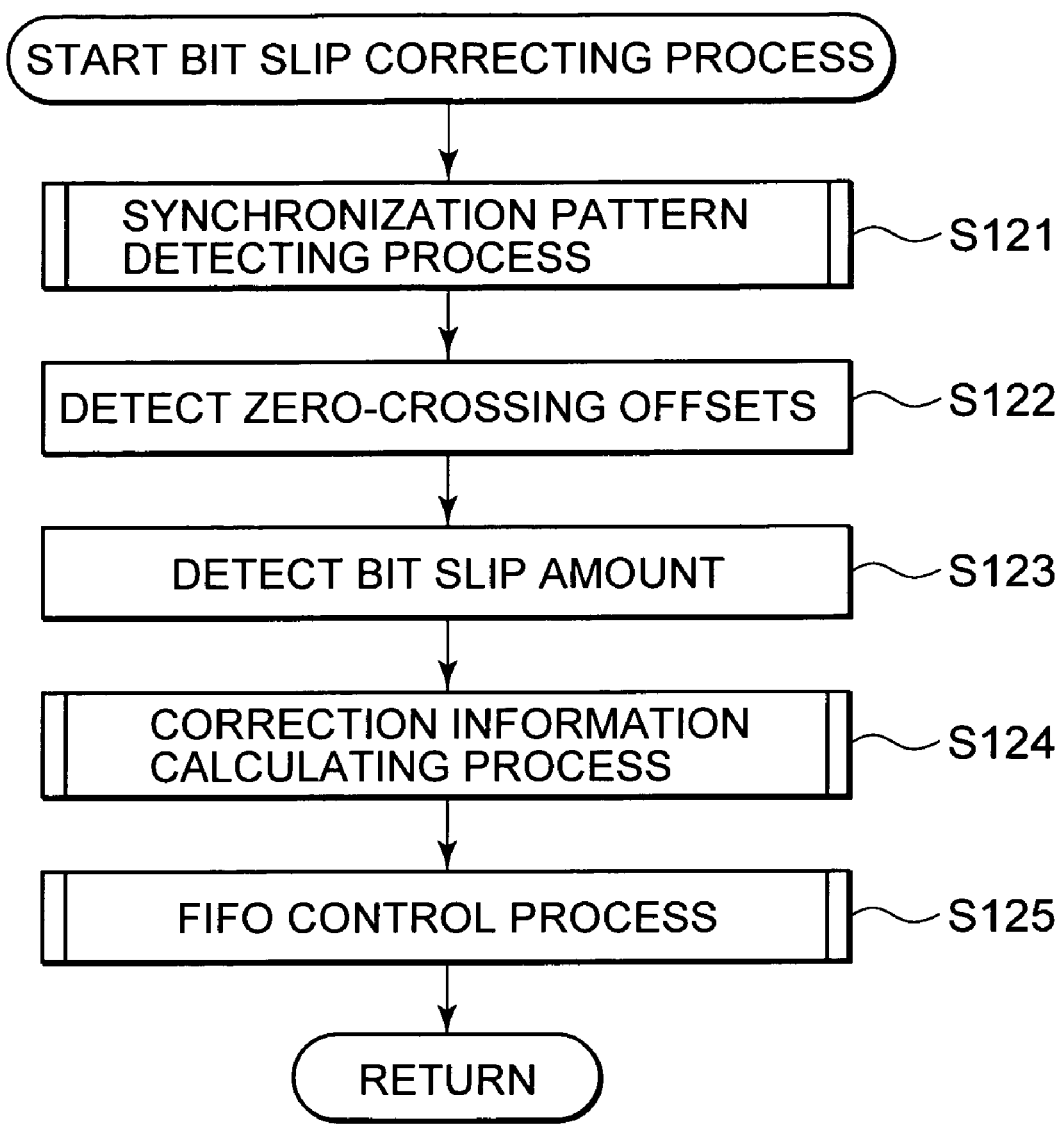
FIG. 26 It is a flowchart for explaining bit slip correction.
Figure 27:
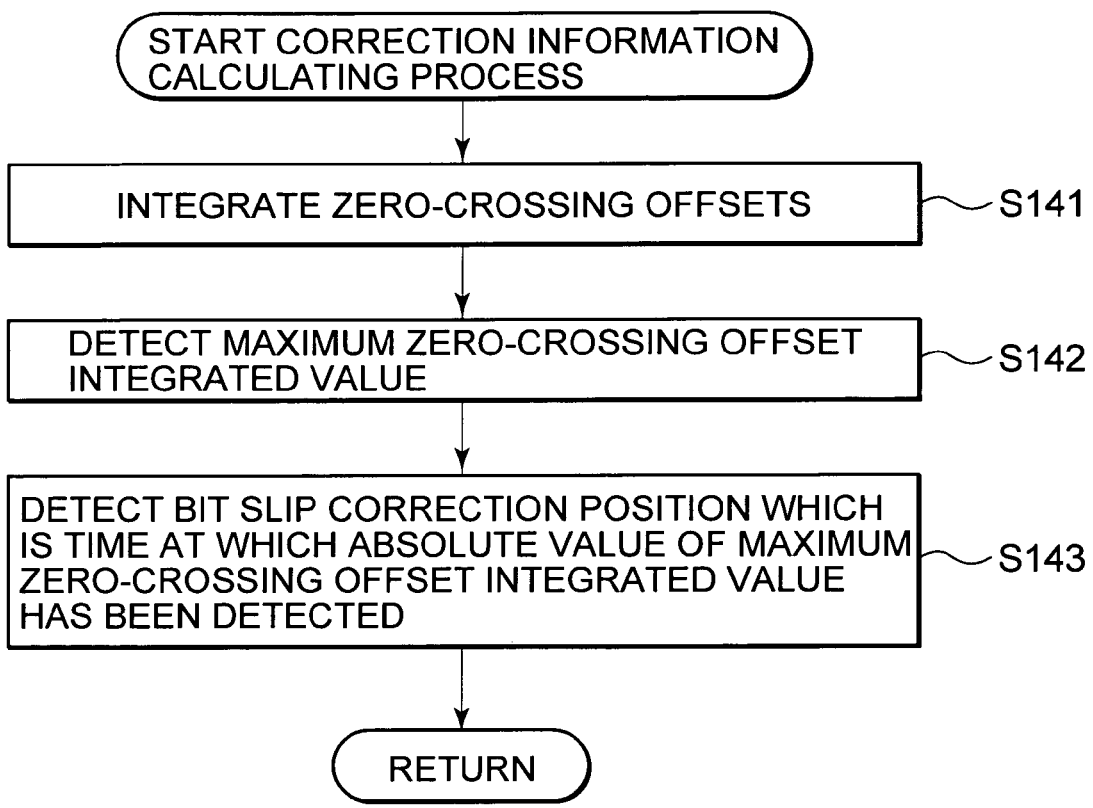
FIG. 27 It is a flowchart for explaining details of a correction information calculating process.

Referring to flowcharts in FIGS. 25 to 27, processing will be described, which is performed by the reproducing apparatus that executes a correction program by using zero-crossing offsets.

Figure 25:
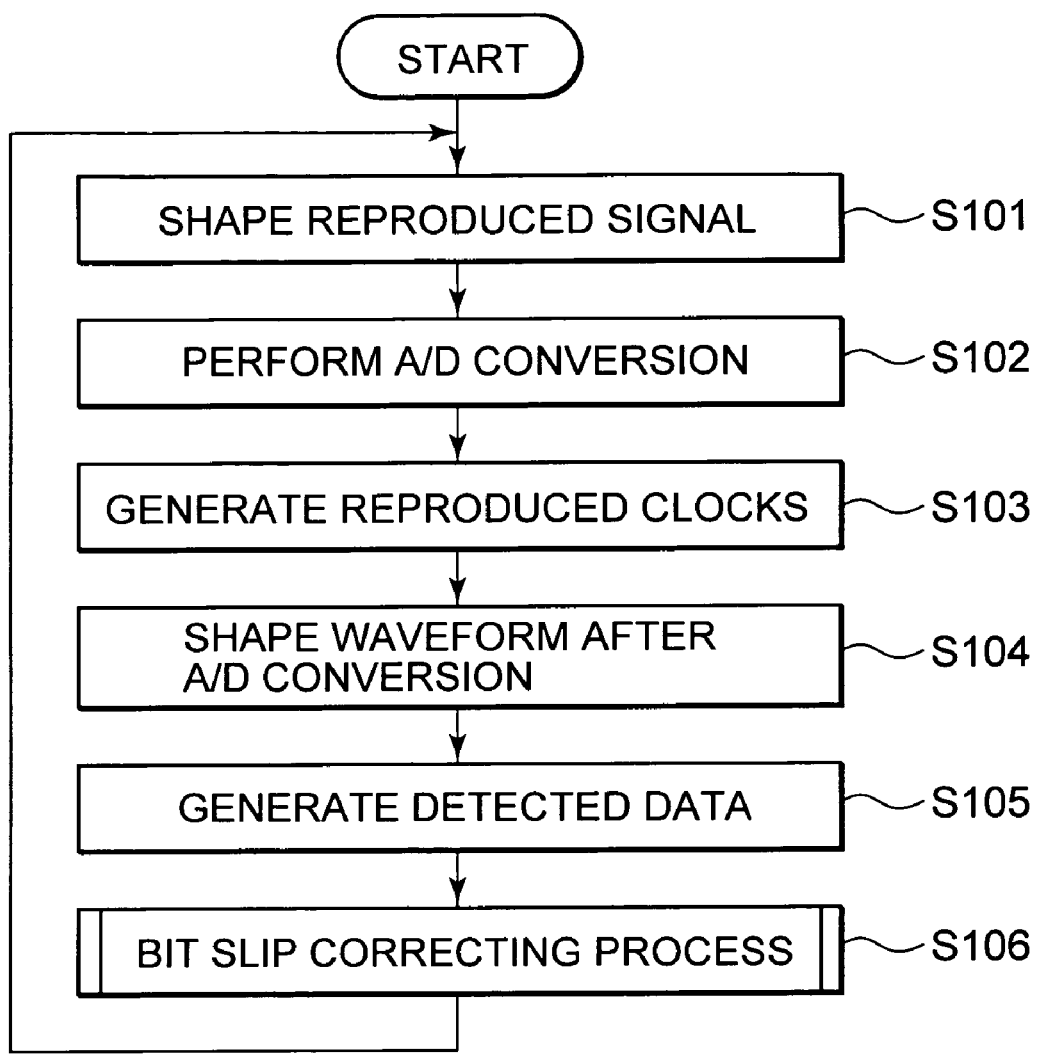
FIG. 25 It is a flowchart for explaining a reproduction process.

FIG. 25 is a flowchart for explaining a reproduction process by the reproducing apparatus.

Steps S101 to S105 are similar to steps S1 to S5 in FIG. 9, respectively, and thus their description will be omitted.

In step S106, a bit slip correcting process using zero-crossing offsets is executed, after which the process returns to step S101, to repeat the above-mentioned processing.

Details of the bit slip correcting process using zero-crossing offsets in step S106 will be described with reference to the flowchart shown in FIG. 26.

Figure 10:
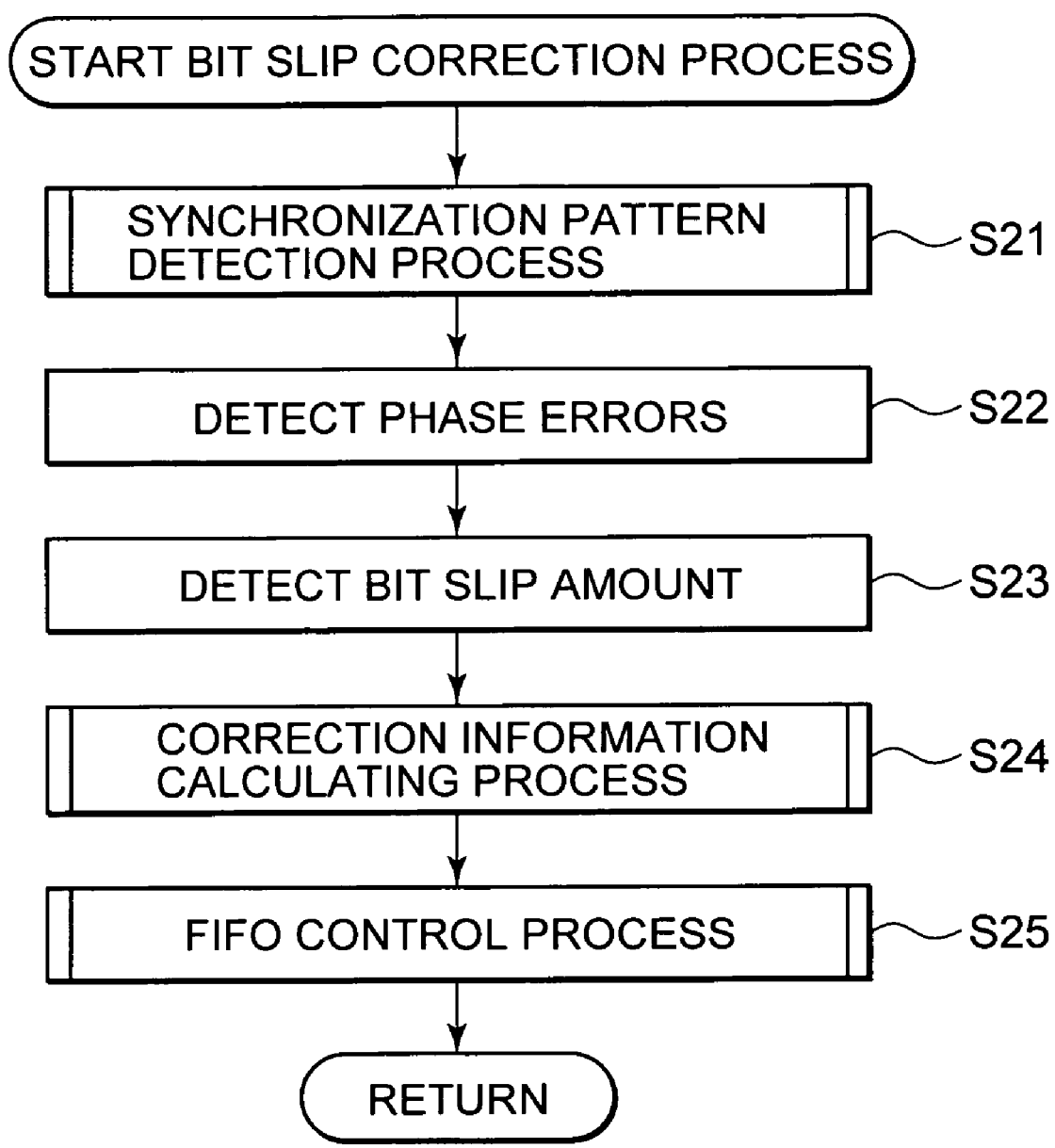
FIG. 10 It is a flowchart for explaining bit slip correction.

Steps S121, S123 and S125 are similar to steps S21, S23 and S25 in FIG. 10, respectively, and thus their description will be omitted.

In step S122, the zero-crossing offset detecting section 301 detects a zero-crossing offset on the basis of equalized amplitude information supplied from the equalizer 34 and the corresponding reproduced clock supplied from the clock generating section 33, and supplies a zero-crossing offset signal representing the zero-crossing offset to the bit slip correcting section 302.

In step S124, the bit slip correcting section 302 executes a correction information calculating process.

Details of the correction information calculating process in step S124 will be described with reference to the flowchart of FIG. 27.

In step S141, the zero-crossing offset integrating section 321 integrates zero-crossing offsets detected in each of predetermined segments, to calculate a zero-crossing offset segment integrated value.

In step S142, the bit slip judging section 311 detects a maximum for the absolute values of the zero-crossing offset segment integrated values.

In step S143, the maximum zero-crossing offset time storing section 322 detects a bit slip correction position which is a time at which the maximum absolute value of the zero-crossing offset segment integrated value has been detected, after which the process is terminated.

Returning to FIG. 26 again, step S125 is executed, after which the bit slip correcting process is terminated.

As mentioned above, the reproducing apparatus executes the correction program by using zero-crossing offsets.

Note that in the above-mentioned examples, a description of detecting an error between the error reference point and the phase error point (or the zero-crossing offset point) has been given as the error detecting process. However, in the present invention, it may alternatively be configured to detect an error between the error reference point and any of points on a straight line connecting a point specified by the start time of a certain cycle of the reproduced clock and an amplitude value data(n−1) of equalized amplitude information at that start time, with a point specified by the start time of a next cycle of the reproduced clock and an amplitude value data(n) of equalized amplitude information at the start time of the next cycle, in a coordinate space having time and amplitude value of equalized amplitude information as its coordinate values, respectively.

That is, it may be configured to detect an error between the error reference point and a value based on the amplitude values of two adjacent equalized amplitude information bits.

Moreover, the process of detecting a zero-crossing offset is not limited to the examples described above. For example, a zero-crossing offset may be detected by a sampling process in which a sampling frequency is doubled for oversampling, whereby to detect an amplitude value of equalized amplitude information at the half cycle point.

Furthermore, the method of detecting an amplitude value of equalized amplitude information at the half cycle point is not limited to oversampling, but may include interpolation as well. Furthermore, it may also be configured to detect an amplitude value of equalized amplitude information at the half cycle point by adding an A/D converter dedicated to such detection.

The series of processes described above can be performed by hardware, but by software as well. In a case of performing the processes depending on software, a program constituting the software is installed into a computer incorporated into dedicated hardware, or, e.g., a general-purpose computer that can perform various processing by installing various programs, from a recording medium.

This recording medium may include, as shown in FIG. 2 or 18, separately from the computer, not only package media, such as the magnetic disk 71 (including a flexible disk), the optical disc 72 (including a CD-ROM (Compact Disc-Read Only Memory), a DVD (Digital Versatile Disc)), the magneto-optical disc 73 (including a MD (Mini-Disc) (trademark)), or the semiconductor memory 74, which is distributed to provide a user with the program and which has the program recorded therein, but also a ROM having the program recorded therein, a hard disk included in a storing section, or the like which is provided with the user as incorporated into the computer.

Note that it may also be configured such that the program for executing the above-mentioned series of processes is installed into the computer through a wired or wireless communication medium, such as a local area network, the Internet or digital satellite broadcasting, via a router, a modem or the like, as necessary.

Moreover, the steps describing the program stored in the recording medium may include processes performed not only time-sequentially according to a sequence described, but also processes executed parallely or individually, if not necessarily time-sequentially.

The invention claimed is:

1. A reproducing apparatus for reproducing data stored to a data storage medium, comprising:

synchronization pattern detecting means for detecting a synchronization pattern from a reproduced signal of the storage medium data;

error detecting means for detecting an error between an amplitude of the reproduced signal and a reference point, the reference point being specified by a time at which a half cycle has elapsed from a start time of one cycle of a clock signal reproduced from the reproduced signal; and correcting means for correcting a deviation of the data from the clock signal corresponding to the error between the amplitude of the reproduced signal and the reference point, the deviation of the data being corrected on the basis of a difference between an interval of the synchronization pattern detected and a predetermined period, and on the basis of a segment time based upon the error detected, the segment time corresponding to a time at which the deviation of the data from the clock signal has occurred, the segment time being one of a plurality of segments into which the interval of the synchronization pattern is divided.

2. The reproducing apparatus according to claim 1, wherein the synchronization pattern detecting means further comprises:

detection range setting means for setting a detection range from which the synchronization pattern is detected, on the basis of a count value of the clock signal; and synchronization pattern detection signal inserting means for inserting a signal representing detection of the synchronization pattern, at a time specified by the period predetermined, where the synchronization pattern has not been detected within the detection range.

3. The reproducing apparatus according to claim 1, wherein the error detecting means detects a phase error, which is an error in a time direction between the reference point and the reproduced signal, and the correcting means corrects the deviation of the data from the clock signal, on the basis of the difference between the interval of the synchronization pattern detected and the period predetermined, and on the basis of the segment time based upon the phase error detected.

4. The reproducing apparatus according to claim 1, wherein the error detecting means detects a zero-crossing offset, which is an error in an amplitude direction between the reference point and the reproduced signal, and the correcting means corrects the deviation of the data from the clock signal, on the basis of the difference between the interval of the synchronization pattern detected and the period predetermined, and on the basis of the segment time based upon the zero-crossing offset detected.

5. The reproducing apparatus according to claim 1, wherein the correcting means further comprises:
   deviation amount detecting means for detecting the difference between the interval of the synchronization pattern and the period predetermined, on the basis of the clock signal, as a deviation amount;
   error integrating means for integrating the error for each of the segments;
   deviation occurrence time detecting means for detecting a deviation occurrence time, which is a time for the segment in which an absolute value of the integrated value integrated becomes maximum between two successive ones of the synchronization patterns;
   a FIFO (First In First Out) buffer for storing the data of a period longer than the period predetermined; and
   control means for controlling the FIFO buffer such that the data equivalent to a period from the deviation occurrence time to a detection time of the synchronization pattern is moved in a time direction according to the deviation amount and the deviation occurrence time, in a case where the deviation amount other than 0 has been detected.

6. A reproducing method for reproducing data stored in a data storage medium, comprising:
   detecting a synchronization pattern from a reproduced signal of the storage medium data;
   detecting an error between an amplitude of the reproduced signal and a reference point, the reference point being specified by a time at which a half cycle has elapsed from a start time of one cycle of a clock signal reproduced from the reproduced signal; and
   correcting a deviation of the data from the clock signal corresponding to the error between the amplitude of the reproduced signal and the reference point, the deviation of the data being corrected on the basis of a difference between an interval of the synchronization pattern detected and a predetermined period, and on the basis of a segment time, based upon the error detected, the segment time corresponding to a time at which the deviation of the data from the clock signal has occurred, the segment time being one of a plurality of segments into which the interval of the synchronization pattern is divided.

7. A computer readable storage medium encoded with computer program instructions that cause a computer to perform a method by which data stored to a data storage medium for reproduction, the method comprising:
   detecting a synchronization pattern which is detected from a reproduced signal from the data storage medium and which is contained in the data;
   detecting an error between an amplitude of the reproduced signal and a reference point, the reference point being specified by a time at which a half cycle has elapsed from a start time of one cycle of a clock signal reproduced from the reproduced signal; and
   correcting a deviation of the data from the clock signal corresponding to the error between the amplitude of the reproduced signal and the reference point, the deviation of the data being corrected on the basis of a difference between an interval of the synchronization pattern detected and a predetermined period, and on the basis of a segment time, based upon the error detected, the segment time corresponding to a time at which the deviation of the data from the clock signal has occurred, the segment time being one of a plurality of segments into which the interval of the synchronization pattern is divided.

* * * * *